United States Patent
Jenkins et al.

(12)

(10) Patent No.: US 6,507,992 B1
(45) Date of Patent: Jan. 21, 2003

(54) HEAD-DISC MERGE ASSEMBLY STATION

(75) Inventors: James Randall Jenkins, Yukon, OK (US); Tommy Joe Metzner, Oklahoma City, OK (US); Roger Allen Jessen, Norman, OK (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/528,960

(22) Filed: Mar. 20, 2000

Related U.S. Application Data

(62) Division of application No. 09/070,610, filed on Apr. 30, 1998, now Pat. No. 6,049,969.
(60) Provisional application No. 60/062,166, filed on Oct. 16, 1997.

(51) Int. Cl.$^7$ .......................... G11B 5/127; H04R 31/00
(52) U.S. Cl. ................. 29/603.03; 29/603.02; 29/603.04; 29/603.05; 29/281.1; 29/281.5; 29/430; 29/709; 29/714; 29/737; 29/784; 29/791; 29/799
(58) Field of Search .................. 29/603.02, 603.03, 29/603.04, 603.05, 281.1, 281.5, 407.01, 430, 709, 714, 737, 784, 783, 791, 799

(56) References Cited

U.S. PATENT DOCUMENTS

| | | | | |
|---|---|---|---|---|
| 4,754,353 A | * | 6/1988 | Levy .......................... 360/106 |
| 4,772,972 A | | 9/1988 | Maeda | |
| 4,829,657 A | * | 5/1989 | Wright ........................ 29/596 |
| 4,862,584 A | | 9/1989 | Budy et al. | |
| 5,012,570 A | * | 5/1991 | Hoskins et al. ............... 29/467 |
| 5,077,888 A | | 1/1992 | Tokisue et al. | |
| 5,265,325 A | * | 11/1993 | Fortin .......................... 29/742 |
| 5,309,628 A | | 5/1994 | Fukuchi et al. | |
| 5,404,636 A | | 4/1995 | Stefansky et al. | |
| 5,465,476 A | | 11/1995 | Krajec et al. | |
| 5,471,733 A | | 12/1995 | Bernett et al. | |
| 5,471,734 A | * | 12/1995 | Hatch et al. ............. 29/603.03 |
| 5,517,375 A | * | 5/1996 | Dion et al. ............... 360/98.07 |
| 5,529,404 A | * | 6/1996 | Robinsn et al. ............. 384/617 |
| 5,551,145 A | | 9/1996 | Jurgenson | |
| 5,555,144 A | | 9/1996 | Wood et al. | |
| 5,557,834 A | | 9/1996 | Miyanaka | |
| 5,655,285 A | * | 8/1997 | Bonn et al. .............. 29/603.03 |
| 5,692,289 A | | 12/1997 | Amada et al. | |
| 5,706,573 A | * | 1/1998 | Lee ......................... 29/603.03 |
| 5,706,574 A | | 1/1998 | Shimanuki | |
| 5,826,325 A | | 10/1998 | Price et al. | |
| 5,910,894 A | * | 6/1999 | Pryor ..................... 364/468.01 |
| 6,032,352 A | * | 3/2000 | Furay et al. ............. 29/603.03 |
| 6,156,078 A | * | 12/2000 | Huat .......................... 29/25.01 |

* cited by examiner

*Primary Examiner*—Peter Vo
*Assistant Examiner*—Paul D Kim
(74) *Attorney, Agent, or Firm*—Fellers, Snider, et al.

(57) ABSTRACT

A method for merging the disc pack, E-block and magnet of a disc drive, the disc pack conveyed to a first selected position in a merge assembly station and moved to a merge slide assembly where calibration measurements of disc pack height and squareness are made at a reference position. The merge slide assembly moves the disc pack from the reference position to a shuttled position, the E-block is moved to an E-block nest assembly where the load arms of the E-block are spread in response to the calibration measurements, and the discs of the disc pack are interweaved between opposing read/write heads of the E-block. A magnet slide assembly positions the magnet to straddle the E-block. The disc pack, E-block and magnet are moved together, maintaining the merged interrelationship, to the basedeck and fastened to the basedeck.

9 Claims, 24 Drawing Sheets

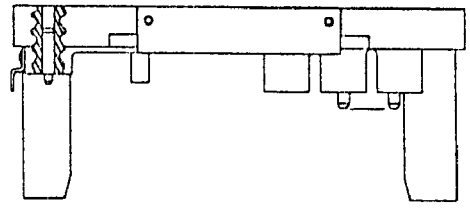
FIG. 3-C
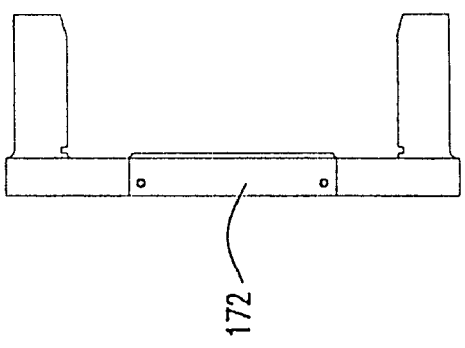
FIG. 3-A
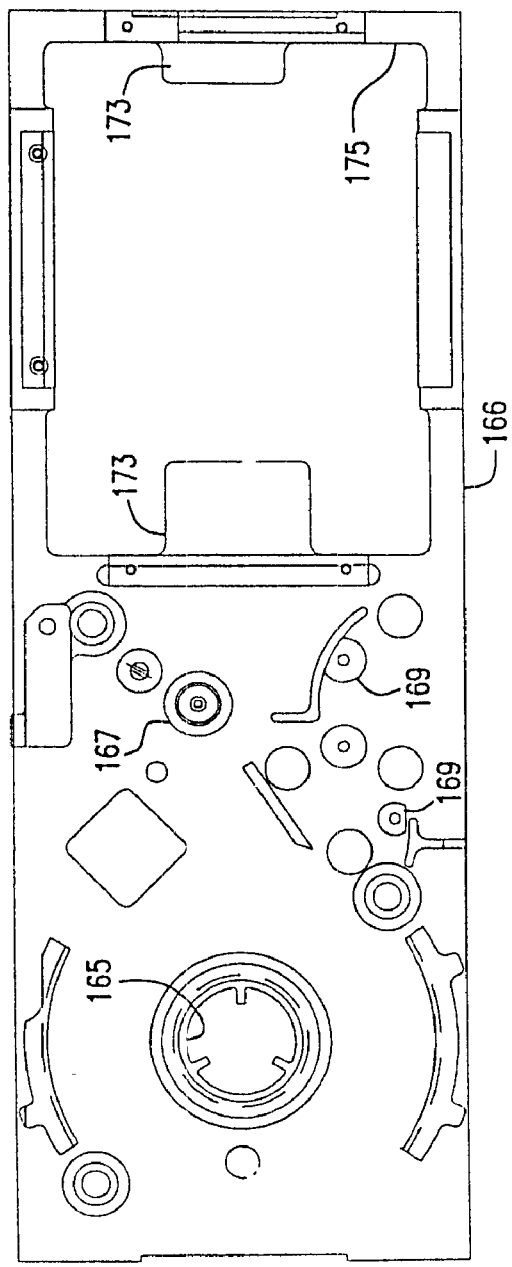
FIG. 3-B

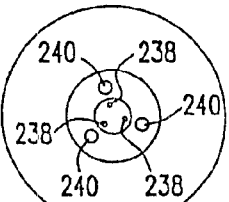
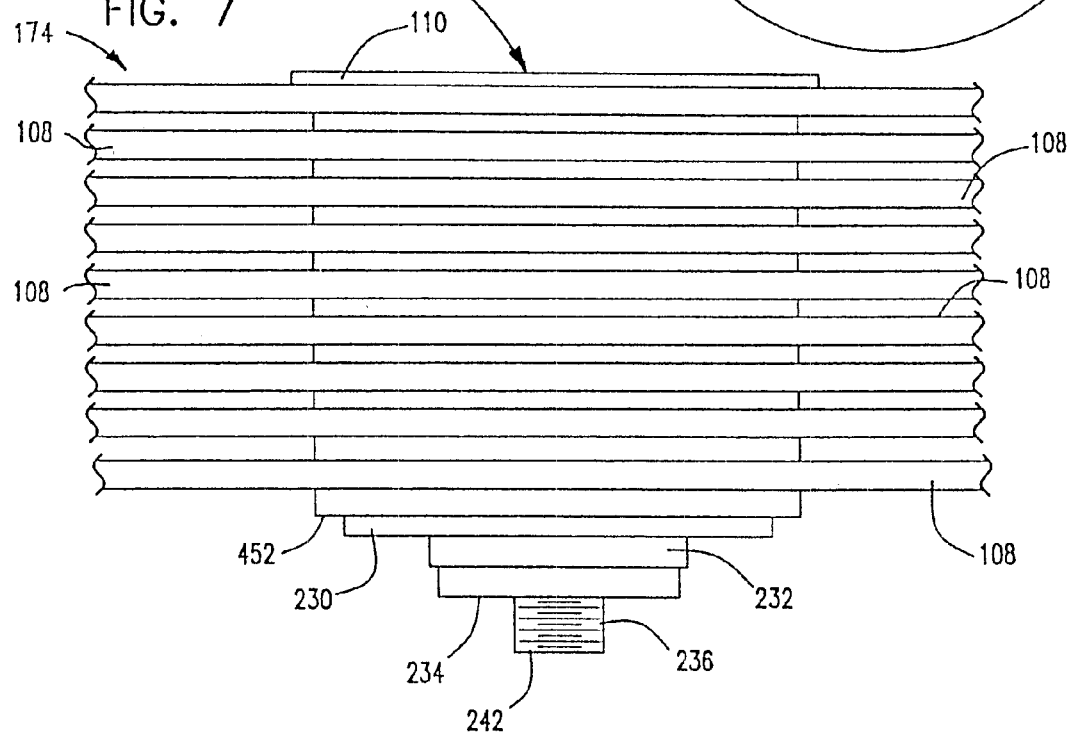
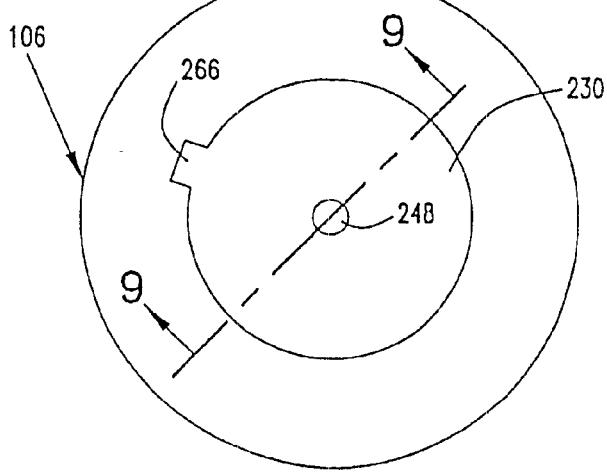
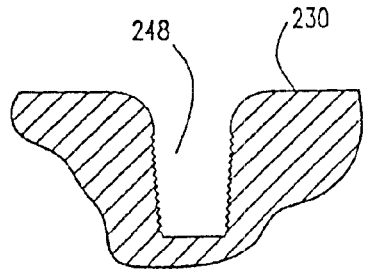

HEAD-DISC MERGE ASSEMBLY STATION

RELATED APPLICATIONS

This application claims the benefit of U.S. Provisional Application Ser. No. 60/062,166 entitled AUTOMATED HEAD/MEDIA MERGE TOOL, filed Oct. 16, 1997 and is a divisional of co-pending parent U.S. patent application Ser. No. 09/070,610 filed Apr. 30, 1998 now U.S. Pat. No. 6,049,969. This application is also related to co-pending U.S. Application Ser. No. 09/070,191 filed Apr. 30, 1998 now U.S. Pat. No. 6,105,240 and to co-pending U.S. Application No. 09/070,577 filed Apr. 30, 1998 now U.S. Pat. No. 6,094,804.

FIELD OF THE INVENTION

The present invention relates generally to the field of disc drive data storage devices, and more particularly, but not by way of limitation, to an automated assembly of a disc drive head-disc assembly which includes a head and disc merge assembly station.

BACKGROUND

Modern hard disc drives are commonly used in a multitude of computer environments, ranging from super computers through notebook computers, to store large amounts of data in a form that can be made readily available to a user. Typically, a disc drive comprises one or more magnetic discs that are rotated by a spindle motor at a constant high speed. The surface of each disc is a data recording surface divided into a series of generally concentric recording tracks radially spaced across a band having an inner diameter and an outer diameter. Extending around the discs, the data tracks store data within the radial extent of the tracks on the disc surfaces in the form of magnetic flux transitions induced by an array of transducers, otherwise commonly called read/write heads. Typically, each data track is divided into a number of data sectors that store fixed sized data blocks.

The read/write head includes an interactive element such as a magnetic transducer which senses the magnetic transitions on a selected data track to read the signal that induces magnetic transitions on the selected data track to write data to the track.

As is known in the art, each read/write head is mounted to a rotary actuator arm and is selectively positionable by the actuator arm over a selected data track of the disc to either read data from or write data to the selected data track. The read/write head includes a slider assembly having an air-bearing surface that causes the read/write head to fly above the disc surface. The air bearing is developed as a result of load forces applied to the read/write head by a load arm interacting with air currents that are produced by rotation of the disc.

Typically, a plurality of open-center discs and spacer rings are alternately stacked on the hub of a spindle motor. The hub, defining the core of the stack, serves to align the discs and spacer rings around a common centerline. Movement of the discs and spacer rings is typically constrained by placing the stack under a compressive load and maintaining the load by means of a clamp ring. Collectively the discs, spacer rings, clamp ring and spindle motor hub define a disc pack envelope or disc pack. The read/write heads mounted on a complementary stack of actuator arms, which compose an actuator assembly, commonly called an "E-block," accesses the surfaces of the stacked discs of the disc pack. The E-block also generally includes read/write head wires which conduct electrical signals from the react/write heads to a flex circuit which, in turn, conducts the electrical signals to a flex circuit connector. The connector in turn is mounted to a flex circuit mounting bracket, and the mounting bracket is mounted to a disc drive basedeck. External to the basedeck the flex circuit connector is secured to a printed circuit board assembly (PCB). For a general discussion of E-block assembly techniques, see U.S. Pat. No. 5,404,636 entitled METHOD OF ASSEMBLING A DISC DRIVE ACTUATOR issued Apr. 11, 1995 to Stefansky et al., assigned to the assignee of the present invention.

The head-disc assembly (HDA) of a disc drive is typically assembled in a clean room environment. The need for maintaining a clean room environment (free of contaminants of 0.3 micron and larger) is to ensure the head-disc interface remains unencumbered and damage free. The slightest damage to the surface of a disc or read/write head can result in a catastrophic failure of the disc drive. The primary causes of catastrophic failure, particularly read/write head crashes (a non-recoverable, catastrophic failure of the disc drive) are generally characterized as contamination, exposure to mechanically induced shock, and non-shock induced damage. The source of non-shock induced damage is typically traced to the assembly process, and generally stems from handling damage sustained by the disc drive during the assembly process.

Several factors that bear particularly on the problem of assembly process induced damage are the physical size of the disc drive, the spacing of the components, the recording densities sought to be achieved and the level of precision to be maintained during the assembly process. The high levels of precision required by the assembly process are necessary to attain the operational tolerances required by the disc drive. The rigorous operational tolerances are in response to market demands that have driven the need to decrease the physical size of disc drive while simultaneously increasing disc drive storage capacity and performance characteristics. Demands on disc drive mechanical components and assembly procedures have become increasingly more critical in order to support capability and size in the face of these new market demands. Part-to-part variation in critical functional attributes in the magnitude of a micro-inch can result in disc drive failures. Additionally, as disc drive designs continue to decrease in size, smaller read/write heads, thinner substrates longer and thinner actuator arms, and thinner gimbal assemblies will continue to be incorporated into the drives, significantly increasing the need to improve the assembly processes to protect the read/write heads and discs from damage resulting from incidental contact between mating components. The aforementioned factors resultingly increase the difficulty of assembling disc drives. As the assembly process becomes more difficult, the need to invent new tools, methods, and control systems to deal with the emerging complexities pose unique problems in need of solutions.

Coupled with the size and performance improvement demands are further market requirements for ever-increasing fault free performance. In response to demands for enhanced reliability, some solutions have begun to emerge. Some disc drives have incorporated the use of ramp load technology. By incorporating ramp load technology, the need to physically merge the E-block assembly with the disc pack during the assembly process is circumvented. The read/write heads are not loaded onto the media until after completion of assembly and the drives are spun-up for the first time. The improved performance is obtained by eliminating read/write head induced media damage, basically by insuring an air bearing is present prior to the read/write heads being loaded to the discs.

Ramp load technology is generally limited to smaller disc drive systems, namely sub 3.5 inch form factors, because those disc drives have relatively few discs so tolerance stack-ups do not become a major factor in the assembly process. Increases in disc diameter, coupled with increasing the number of discs in the disc pack, heighten the demands of maintaining the dimensional, mechanical and operational integrity between the E-block and the disc pack. Tolerance stack-ups become very critical in the assembly process and conformation of dimensional attributes of the disc pack and the E-block assembly must be made prior to any attempts in merging the two. Dependence on ramp load technology as the means to accomplish the head-disc merge for larger diameter, multiple surface disc packs would permit a number of E-block to disc pack interface mismatches to escape the process, resulting in sub-optimal performance or even failure of the product. Ramp load technology fails to provide the precision and repeatability required by larger and more complex disc drives.

The progression of continually decreasing disc thickness and disc spacing, together with increasing track density and increasing numbers of discs in thle disc pack, has resulted in a demand for tools, methods and control systems of ever increasing sophistication. A result of the growth in demand for sophisticated assembling equipment has been that a decreasing number of assembly tasks involve direct operator intervention. Many of the tasks involved in modern methods are beyond the capability of operators to reliably and repeatably perform.

In addition to the difficulties faced in assembling modern, high capacity, complex disc drives, actual product performance requirements have dictated the need to develop new process technologies to ensure compliance with operating specifications. The primary factor driving more stringent demands on the mechanical components and the assembly process is the continually increasing areal densities and data transfer rates of the disc drives.

The continuing trend in the disc drive industry is to develop products with ever increasing areal densities, decreasing access times and increasing rotational disc pack speeds. These three factors, in combination, place greater demands on the ability of modern servo systems to control the position of read/write heads relative to data tracks. As track densities continue to increase, a significant problem that results is the ability to assemble HDAs nominally free from the effects caused by unequal load forces on the read/write heads, disc pack imbalance or one of the components of runout, velocity and acceleration (commonly referred to as RVA). The components of RVA are: disc runout (a measure of the motion of the disc along the longitudinal axis of the motor as it rotates); velocity (a measure of variations in linear speed of the disc pack across the surface of the disc) and acceleration (a measure of the relative flatness of the discs in the disc pack). By design, a disc drive typically has a discreet threshold level of resistance to withstand rotationally induced noise and instability, below which the servo system is not impaired. Also, a fixed range of load forces must be maintained on the read/write head to ensure proper fly height for data exchange. The primary manifestations of mechanically induced noise and instability are (1) vibration induced read/write head oscillation, (2) beat frequencies written into the servo signal at the servo write station and (3) non-repeatable runout. Oscillations are often introduced to the system via (1) deformations of the disc surface, (2) harmonics induced by disc pack imbalance, or (3) excessive surface accelerations encountered by the read/write head while flying on track or traversing the disc surface during track seeks. Verification of disc pack compliance to the RVA specifications is crucial to the overall quality and long term reliability of the product. To ensure RVA compliance, measurements are taken to determine: (1) the amount of runout present in the disc pack, (2) absence of concave or convex disc profile as well as absence of a wavy disc profile across the surface of the discs, and (3) absence of a wavy disc profile around each track circumference.

The foregoing measurements require sophisticated metrological instruments and techniques. The complexity of the measurements render them very difficult for an operator to perform, particularly at high assembly run rates. Specific problems arising out of operator executed or operator assisted measurements include the frequency of damage to the discs and inconsistent and/or inaccurate measurement results obtained from a manually based measurement process. Both component damage and measurement errors occur from operator inability to maintain a sufficiently close interface with the measurement instruments as is demanded by the measurement process and associated instruments.

Damage to disc surfaces can cause read/write head crashes, while disc packs not in compliance to the surface acceleration profiles are known to cause at least three distinct problems in disc drive performance. The first problem relates to disc drive response to a concave or convex disc surface. A concave surface causes the fly height of the read/write head to decrease. A decrease in fly height increases the signal to noise ratio during read-write functions, but increases the read/write head susceptibility to surface aspirates that disrupt the air bearing, causing the read/write head to lose flight stability. A convex surface causes the fly height of the read/write head to increase. An increase in fly height decreases the read/write head susceptibility to surface aspirates but also decreases the signal to noise ratio during read/write functions. A significant decrease in the signal to noise ratio can cause data errors and/or servo burst misreads which cause the disc drive to suspend operations.

The second problem arising from non-complying disc packs relates to the drive response to radially wavy profiles across the surface of the discs in the disc pack. A disc profile of this nature causes abrupt changes in the read/write head fly height during seek operations. Abrupt changes in fly height encountered during seek operations can send the read/write head into oscillation, causing the read/write head to miss or misread a track-crossing, resulting in an overshoot or undershoot of the seek track. Furthermore, an abrupt change in fly height during a seek operation can cause contact that damages the disc and/or the read/write head. In a worst case, the contact can be of an intensity that results in a read/write head crash.

The third problem caused from non-complying disc packs is similar in nature to the second problem as it also relates to the disc drive response to wavy profiles. However, the wavy profiles of concern for this problem are circumferentially wavy disc surface profiles. The problem that is encountered when a read/write head encounters a circumferentially wavy disc surface profile is read/write head oscillation following a seek operation or during a track following operation. As with the radially non-flat surface, the circumferentially non-flat surface causes abrupt changes in read/write )lead fly height inducing the same type of responses described above, i.e., flight instability, oscillation, disc contact, read/write head crashes and even loss of servo lock.

Typically, in a phase lock loop servo system, after each seek a settling time is required to allow for seek induced read/write head oscillation to dampen out and allow the read/write head to come on track. Read/write head instability often results in the disc drive having an inability to read the information contained in its servo frame. If instability remains at the end of the allocated settle time, the disc drive will normally retry the function. After a set number of unsuccessful retries the disc drive reports a failure to the system and discontinues the seek process. However, should the system attain servo lock, a mechanically induced noise causing read/write head oscillation of sufficient duration will cause the system to lose its lock and malfunction.

The operating performance of the disc drive servo system is affected by mechanical factors beyond the effects of mechanically induced read/write head oscillation from disc surface anomalies. Beat frequencies written into the servo frames during the servo track writing process can cause servo system failure to phase lock, to lock to an inappropriate signal, or to lose phase lock and fall off track. Beat frequencies are typically caused by bernelled bearings (flat spots on a bearing surface resulting from handling or assembly damage), or by disc pack imbalance. Mechanical noise can cause perceived amplitude changes in the servo burst signals through acceleration induced fly height changes. Shifts in servo burst signal amplitudes, perceived or real, cause the servo system to adjust the position of the read/write head. If the signals are false, the servo system can drive the read/write heads off track, causing the drive to halt operations. Additionally, mechanical noise can supply frequency response mis-queues to the servo system. The frequency response mis-queues are a result of harmonics being generated by the mechanics in the same frequency range as the servo system crossover frequency. Either phenomenon can cause the servo system to drive the read/write head off track.

Another form of mechanical noise induced malfunction of the servo system is runout. One intent of a disc drive design is to have nominally concentric data tracks. Concentricity of a data track is measured from the ideal or theoretical center of rotation of the disc pack. From the perspective of the read/write head, each data track is positioned a fixed distance from the theoretical center of rotation the disc pack. Servo systems are designed with this geometric relationship in mind. If the actual concentricity of the data track excessively or abruptly deviates from the theoretical concentricity the servo system will be incapable of responding with appropriate corrections to allow the servo system to maintain its phase lock, a condition required to assure that read/write heads stay on track.

A related problem that occurs as track densities increase is variation in the width of the tracks. Whereas such variations in track width.have not been a significant factor in obtaining accurate servo control in previous disc drives having relatively lower track densities, as track densities continue to increase variations in track width become increasingly significant. Such variations in track width can occur as a result of imperfections in the magnetic media of the discs, or can occur as a result of errors in the servo track writing process during manufacturing. Errors are traceable to the same family of disc pack imbalance and RVA noise sources discussed hereinabove. Even with improved approaches to the generation of position error signals in the disc drive servo system, the ability of the system to deal with such issues is finite. The limits of the servo system capability to reliably control the position of the read/write head relative to the data track must not be consumed by the noise present in the HDA resulting from the assembly process. Consumption of the available margin by the assembly process leaves no margin in the system to accommodate changes in the disc drive attributes over the life of the product. An inability to accommodate changes in the disc drive attributes leads to field failures and an overall loss in product reliability, a detrimental impact to product market position.

Although the servo system is the system primarily affected by mechanically induced system noise, the disc drive read-write channel is equally dependent upon the mechanical integrity of the HDA. The issues discussed hereinabove regarding the inability of an oscillating read/write head to accurately read servo data also applies to read-write data. However, it is typical for read-write data to demonstrate a much lower signal to noise ratio than is present in the disc drive servo burst signals and gray code, thereby rendering read/write head capability in read data fields more susceptible to read errors. Read errors have frequently been traced to head-disc misalignments of the type causing a change in the fly height characteristics of the read/write head. Changes in fly height that increase the fly height cause the read/write head transducer to be located farther away from the data fields. The increased distance between the transducer and the data field imparts the perception of a decrease in data bit field strength relative to the background noise, resulting in an inability to read the data contained in the data field. Attempts to perform accurate measurements of head-disc misalignments occurring as a result of disc pack tilt have not been successful in manual head-disc merge operations. The inability to verify the presence of a head-disc misalignment during the read/write head-disc merge operation leads to rework of disc drives that subsequently fail in the disc drive production process. Reworking of disc drives exposes the disc drive, in particular the disc drive HDA, to increased handling, thereby increasing the probability of damage to the disc drive.

Components of modern disc drives have a relatively high susceptibility to damage induced through mechanical shock. One type of shock induced damage presented by prior merge operations deals with the problem of "head slap." Head slap is a term used to describe the dynamics of a read/write head, resting on a disc, in response to mechanically induced shock. The shock causes the read/write head to lift off the disc, and once off the disc the gimbal spring cants the read/write head as the force of the load arm drives the read/write head back to the disc. Typically, the first point of contact of the read/write head are the corners thereof against the disc surface. It is known that shocks of a load of greater than 20 grams for duration of 0.5 milliseconds or less will cause head slaps. It is also well known that the results of head slaps often lead to read/write head crashes.

Taken in combination—the tasks involved in assembling a modern disc drive exceeds the capability of manual assemblers; the susceptibility of the disc drive to damage during the assembly process; the level of precision assembly required by increasingly areal densities; and the need to minimize adverse effects of mechanically induced noise on the disc drive servo system—have culminated to render prior disc drive assembly method archaic.

Thus, in general, there is a need for an improved approach to disc drive assembling technology to minimize the potential of damage during assembly, to produce product that is design compliant and reliable, and to minimize mechanically induced system noise. More particularly, there is a need for an automated dynamic balance correction of a disc drive.

SUMMARY OF THE INVENTION

The present invention provides an apparatus and a method for merging a disc pack, E-block and magnet assembly in an automated assembly process requiring minimum operator attention.

A merge assembly station has a conveyor which transports a pallet supporting disc drive assembly components, the components including the disc pack, E-block and magnet assembly.

The merge assembly station advances the disc pack to a first selected position, and a rotary positioner assembly positions the disc pack to electronically communicate with a power supply harness. The rotary positioner has an extensible cylinder to lift and rotate the disc pack, and a sensor senses an identifying aperture next to the electrical contacts of tie disc drive motor. The rotary positioner advances the disc pack to a position so that the electrical contacts of the disc drive motor are properly oriented.

A positioner assembly supports an end effector which supportingly engages the disc pack to move the disc pack from the pallet to a merge slide assembly. The merge slide assembly shuttles the disc pack between a merged and a shuttled position. In the merged position a pack gauge assembly gauges the height and squareness of the disc pack for compensation of a head spreader assembly which engages the E-block during merging of the disc pack and the E-block.

With the disc pack supported by the merge slide assembly in the shuttled position, the end effector supportingly engages the E-block and moves the E-block to an E-block nest assembly. The end effector supportingly engages and moves the magnet from the pallet to a magnet load assembly.

In merging the disc pack and the E-block, the spreader assembly spreadingly engages the load arms of the E-block to provide clearance to permit the passing of a disc between opposing load arms. The merge slide assembly is moved to the merged position to interleave the discs of the disc pack within opposing read/write heads of the E-block. In merging the E-block and the magnet assembly, the magnet load assembly first displaces and pivots the magnet into a position about the actuator coil of the E-block.

With the disc pack and the magnet both merged on opposing ends of the E-block the end effector supportingly engages and moves all three components together, maintaining the merged relationship therebetween, to the basedeck, where the disc pack, E-block and magnet are positioned in a final assembly relationship. A number of automatic fastener attachment assemblies attach fasteners to maintain the final assembly relationship.

These and various other features as well as advantages which characterize the present invention will be apparent from a reading of the following detailed description and a review of the associated drawings.

BRIEF DESCRIPTION OF THE DRAWINGS

FIG. 3A is an end view of a pallet of the type used by the disc drive assembly line of FIG. 2.

FIG. 3B is a top view of tie pallet of FIG. 3A.

FIG. 3C is an opposite end view of the pallet of FIG. 3A.

FIG. 6 is a bottom end view of the spindle motor of the disc drive of FIG. 1.

FIG. 7 is an elevational view of the spindle motor of FIG. 6 having a plurality of discs and spacers mounted thereon, and clamped together by a clamping ring to form a disc pack.

FIG. 8 is a top view of the spindle motor of FIG. 7 without the discs, spacers, and clamping ring.

FIG. 9 is a partial sectional view along the line 9—9 in FIG. 8.

DETAILED DESCRIPTION

Figure 1:
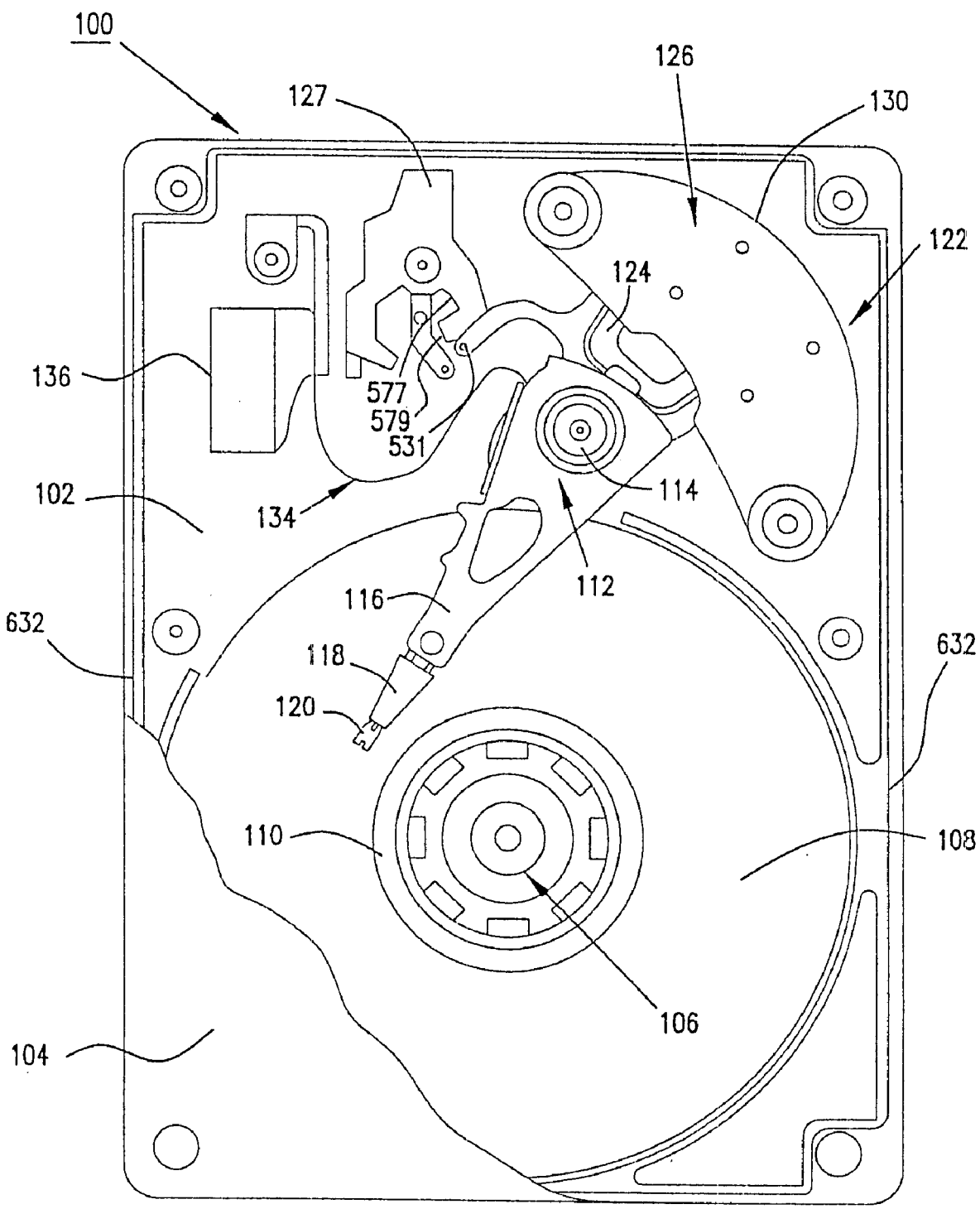
FIG. 1 is a top view of a disc drive of the type that is assembled by the method and apparatus of the present invention. The housing cover is partially cutaway.

Referring to the drawings in general, and more particularly to FIG. 1, shown therein is a top view of a disc drive 100 constructed in accordance with the present invention. The disc drive 100 includes a basedeck 102 to which various disc drive components are mounted, and a top cover 104, which together with the basedeck 102 provides a sealed internal environment for the disc drive 100. The top cover 104 is shown in a partial cut-away fashion to expose selected components of interest. It will be understood that numerous details of construction of the disc drive 100 are not included in the following description as such are well known to those skilled in the art and are believed to be unnecessary for the purpose of describing the present invention.

Mounted to the basedeck 102 is a spindle motor 106 to which a plurality of discs 108 are mounted and secured by a clamp ring 110 for rotation at a constant high speed. Adjacent the discs 108 is an actuator assembly 112 (sometimes also referred to as an "E-block") which pivots about a cartridge bearing 114 in a rotary fashion. The actuator assembly 112 includes actuator arms 116 (only one shown) that support load arms 118. Each load arm 118 in turn supports read/write heads 120, with each of the read/write heads 120 corresponding to a surface of one of the discs 108. As mentioned hereinabove, each of the discs 108 has a data recording surface divided into concentric circular data tracks, and the read/write heads 120 are positionably located over data tracks to read data from, or write data to, the tracks.

The actuator assembly 112 is controllably positioned by way of a voice coil motor assembly (VCM) 122, comprising an actuator coil 124 immersed in the magnetic field generated by a magnet assembly 126. A latch assembly 127 is disposed to latch the actuator assembly in a predetermined park position when the disc drive 100 is turned off. A magnetically permeable flux path such as a steel plate 130 (sometimes referred to as a pole piece 130) is mounted above the actuator coil 124 to complete the magnetic circuit of the VCM 122. When controlled DC current is passed through the actuator coil 124, an electromagnetic field is set up which interacts with the magnetic circuit of the VCM 122 to cause the actuator coil 124 to move relative to the magnet assembly 126 in accordance with tie well-known Lorentz relationship. As the actuator coil 124 moves, the actuator assembly 112 pivots about the cartridge bearing assembly 114, causing the heads 120 to move across the surfaces of the discs 108 thereby allowing the heads 120 to interact with the data tracks of the discs 108.

To provide the requisite electrical conduction paths between the heads 120 and disc drive read/write circuitry (not shown), read/write head wires (not separately shown) are routed on the actuator assembly 112 from the heads 120, along the load arm 118 and the actuator arms 116, to a flex circuit 134. The read/write head wires are secured by way of a suitable soldering process to corresponding pads of a printed circuit board (PCB) of the flex circuit 134. The flex circuit 134 is connected to a flex circuit bracket 136 in a conventional manner, which in turn is connected through the basedeck 102 to a disc drive PCB (not shown) mounted to the underside of the basedeck 102. The disc drive PCB provides the disc drive read/write circuitry which controls the operation of the heads 120, as well as other interface and control circuitry for the disc drive 100.

Figure 2:
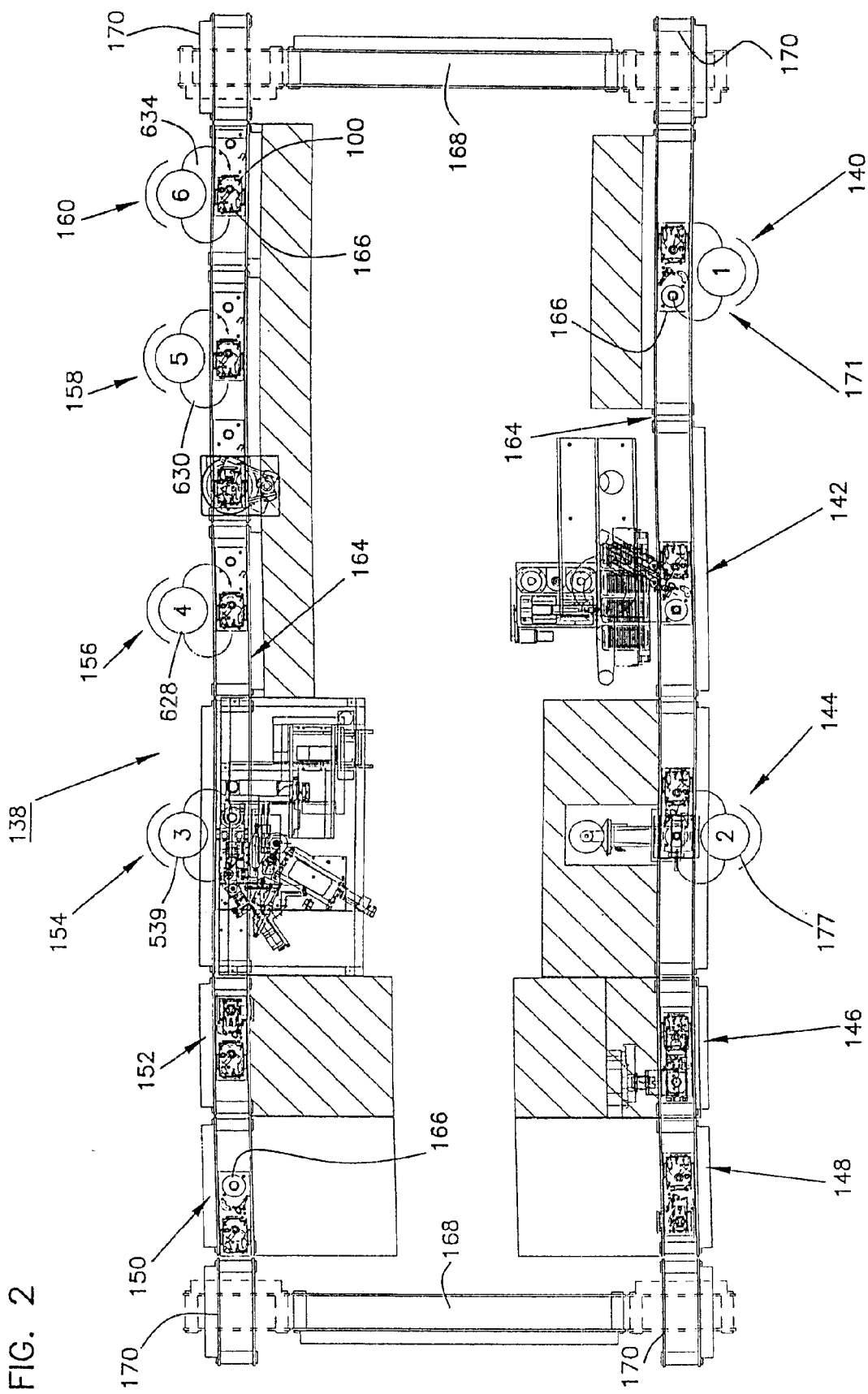
FIG. 2 is a diagrammatic, top plan view of an automated disc drive assembly line constructed in accordance with the present invention for the automated assembly of the disc drive of FIG. 1.

FIG. 2 is a diagrammatic representation of a disc drive assembly line 138 constructed in accordance with the present invention. The major components of the disc drive assembly line 138 are as follows: a pallet load station 140; a disc install station 142; a clamp ring install station 144; a runout-velocity-acceleration (hereinafter "RVA") station 146; a balance measurement station 148, a balance correction station 150; a balance verification station 152; a head-disc merge station 154; a filter install station 156; a cover install station 158; and a line off-load station 160.

Each of the stations has a station control computer (as noted) to control the movements and sequences of the functions performed therein. In addition, all of the station control computers are linked to a production system computer (not shown) which passes information between stations and broadcasts information to all stations. It will be understood that the production system computer can be located at any desired location, and being conventional, need not be described herein with regard to its construction or operation.

It will be noted from FIG. 2 that the general arrangement of the stations forms a characteristically rectangular layout. However, any physical arrangement between the pallet load station 140 and the line off-load station 160 can be used, such as a straight-line arrangement or an arcuate arrangement, as will be determined by such factors as the available floor space and other procedural requirements.

As will be discussed hereinbelow, the stations have conveyor portions which are joined to form a continuous conveyor 164 between the pallet load station 140 and the balance measurement station 148, and likewise between the balance correction station 150 and the line off-load station 160. A number of pallets 166 are shown at various positions along the conveyor 164. The pallet 166 shown at the line off-load station 160 contains a completely assembled disc drive 100 when all the assembly operations of all the stations have been successfully completed. The pallet 166 at the pallet load station 140 contains a plurality of unassembled components which form the disc drive 100. Each pallet 166 transports the components of the disc drive 100 to the stations, and in cooperation with the stations, fixtures the components as appropriate for the various assembly processes as will be described further below.

As discussed above, it will be noted from FIG. 2 that the general rectangular arrangement of the conveyor 164 forms opposing legs, the first leg connecting the pallet load station 140 and the balance measurement station 148 and all the stations therebetween, and the second leg connecting the balance correction station 150 and the line off-load station 160 and all the stations therebetween. A transfer conveyor 168 connects the balance measurement station 148 and the balance correction station 150. Another transfer conveyor 168 provides a conveyor connection between the line off-load station 160 and the pallet load station 140. In this manner it will be noted that FIG. 2 illustrates a closed-loop conveyor 164 which permits a pallet 166 to be returned to the beginning of the disc drive assembly line 138 if necessary, such as for repair or retest. A number of rotary transfer conveyors 170 are used to shuttle and rotate the pallets 166 to and from the transfer conveyors 168.

Pallet Load Station

It will be noted from FIG. 2 that a first operator designated as 171 attends the pallet load station 140 to provide a manufacturing record of the components used in each disc drive 100. A conventional bar code scanner and a computer keyboard (not shown) are provided for communication with both a station control computer (not shown) and the production system computer.

FIGS. 3A through 3B show the pallet 166 which has an identifying bar code label 172 that is scanned and reported to the production system computer to track the pallet 166 through the disc drive assembly line 138. Also recorded to the production system computer is the product type, as well as a serialized identification of the base deck 102 and the E-block 112, as well as lot number identification of the spindle motor 106 and the magnet assembly 126.

The spindle motor 106 is supported by a bushing 165 in the pallet 166. The E-block 112 is supported by a pin 167 that supportingly engages the cartridge bearing 114. The magnet assembly 126 is located by a pair of pins 169. The basedeck 102 is supported by a pair of supports 173 that extend into an opening 175 in the pallet 166.

The latch 127 is preassembled as a subassembly of the basedeck 102 in an upstream assembly operation. Also pre-assembled to the spindle motor 106 is a spider assembly consisting of an endcap supported by the top of the spindle motor 106, and having, six streamers of a polyamide material, such as Kapton from Dupont, which are placed longitudinally along the spindle motor 106 to provide an even circumferential spacing between the spindle motor 106 and the discs 108.

Disc Install Station

As shown in FIG. 2, the disc install station 142 performs an automated procedure with minimum attendance by an operator. The disc install station 142 is of conventional stricture and need not be described herein except as follows. Drawing details are not provided since such is not considered necessary for a full understanding by a person skilled in the art to produce the disc install station 142 or an equivalent thereof When the disc install station 142 is free, the station control computer advances the conveyor 164 to release one of the pallets 166 into the disc install station 142 work envelope. A conventional optical sensor detects the pallet 166 and pauses the conveyor 164 to operably position the pallet 166. A conventional bar code scanner reads the bar code label 172 and queries the production system computer to determine the product type to be built and queries a look-up table in a station control computer (not shown) to determine the corresponding product disc pack routines.

A typical motor lift assembly raises to engage the bushing 165 in the pallet 166 to lock the pallet 166 in place, the motor lift assembly having an extensible shaft that lifts the spindle motor 106 from the pallet 166. The disc install station 142 has a scanner which records to the production system computer the lot identification of the discs 108 used in the disc drive 100. A sensor verifies the presence of the spindle motor 106 to verify that the correct spindle motor 106 is present for the desired disc drive 100. If not, the spindle motor 106 is returned to the pallet 166 and the pallet 166 is released by the station control computer without adding discs 108 to the spindle motor 106. The station control computer notifies the production system computer that the wrong spindle motor 106 was loaded, and the production system computer reports the nonconformance to the pallet load station 140, and all downstream station control computers query the pallet load station 140, as is described below, for an instruction to bypass the nonconforming disc drive 100 to prevent further value-added work thereto.

If the spindle motor 106 is correct, a conventional robotic arm picks and places the discs 108 and spacer rings onto the spindle motor 106 in appropriate sequence. When all the discs 108 and spacer rings have been placed on the spindle motor 106, the motor lift assembly lowers the spindle motor 106 back onto the pallet 166, and the pallet 166 is released so that the conveyor 164 can advance the pallet 166 to the clamp ring install station 144.

Clamp Ring Install Station

From the disc install station 142 the pallet 166 is conveyed to the clamp ring install station 144. The clamp ring install station 144 is of conventional structure and need not be described herein except as follows. Drawing details are not provided since such is not considered necessary for a full understanding by a person skilled in the art to produce the clamp ring install station 144 or an equivalent thereof A scanner at the clamp ring install station 144 reads the bar code label 172 and communicates with a station control computer (not shown) which queries the production system computer to determine whether the pallet 166 is approved for further processing.

If approved, the pallet 166 is moved into an operable position in the clamp ring install station 144, whereat the conveyor 164 is paused. A conventional motor lift assembly raises to engage the bushing 165 to lock the pallet 166, the motor lift assembly having an extensible cylinder that lifts the spindle motor 106 out of the pallet 166. A clamp presenter supports the clamp ring 110 while it is inductively heated to increase in diameter by thermal expansion. The clamp ring, after expansion, is presented to a clamping mandrel which provides a packing force to the clamping ring to compress the stack of discs under the clamp ring 110. The clamp ring 110 conductively cools and shrinks into locking engagement with the spindle motor 106.

The motor lift assembly lowers the spindle motor 106, discs 108 and the clamp ring 110, which together will hereinafter be referred to as disc pack 174 as shown in FIG. 7, onto the pallet 166. A second operator, designated 177, removes the spider assembly from the spindle motor 106 and the pallet 166 is conveyed to the RVA measurement station 146.

RVA Measurement Station

From the clamp ring install station 144 the pallet 166 is conveyed to the runout-velocity-acceleration (hereinafter "RVA") measurement station 146 where the runout, velocity and acceleration attributes of the disc pack 174 are measured and recorded to another conventional station control computer (not shown). The RVA measurement station 146 is of conventional structure and need not be described herein except as follows. Drawing details are not provided since such is not considered necessary for a full understanding by a person skilled in the art to produce the RVA measurement station 146 or an equivalent thereof.

When the RVA measurement station 146 station control system is free, the station control computer calls forth the pallet 166 from the clamp ring install station 144. A conventional bar code scanner reads the bar code label 172 and the station control computer queries the production system computer to determine the eligibility for further processing. If the pallet 166 is rejected by any upstream station, the pallet 166 will pass through the RVA measurement station 146 without further value-added processing.

If accepted, the pallet 166 enters the RVA measurement station 146 to a point where a conventional sensor detects the pallet 166 and signals the conveyor 164 to pause. A conventional rotary positioner raises to engage the bushing 165 to lock the pallet 166 on the conveyor 164, the rotary positioner having an extensible cylinder that lifts and rotationally orients the disc pack 174 for proper alignment of the spindle motor 106 with electrical supply contacts for functional testing thereof The rotary positioner then lowers the disc pack 174 to the pallet 166 and releases the pallet 166, which is advanced to a second position adjacent a typical balance measurement assembly 178 where locking pins engage the pallet 166.

The balance measurement assembly 178 lifts the disc pack 174 into pressing engagement against an opposing supporting mandrel to clamp the disc pack 174 for functional testing. The lifting portion of the balance measurement assembly 178 has integral power supply contacts which electrically contact the disc pack 174 to power the spindle motor 106. In this manner, the balance measurement assembly 178 powers the spindle motor 106 to spin the discs 108 at a constant speed. The balance measurement assembly 178 activates conventional measurement transducers to measure and record the runout, velocity, and acceleration (RVA) characteristics.

The runout of the discs 108 is a measure of tie axial variation of the height of the disc 108 surface around a circumferential arc of a specific radius. The velocity is a measure of the rate of change of the axial displacement of the disc 108 surface around a circumferential arc of a specific radius. The acceleration is a measure of the rate of change of the disc 108 velocity around a circumferential arc of a specific radius The station control system compares the RVA readings to design specifications, and accepts or rejects the disc pack 174 accordingly. The RVA test status is communicated by the station control computer to the production system computer, and the pallet 166 is released from the RVA measurement station 146 for advancing to the balance measurement station 148.

Balance Measurement Station

To this point in the disc drive assembly line 138 the disc pack 174 has been conveyed through the pallet load station 140, the disc install station 142, the clamp ring install station 144 and the RVA measurement station 146. It will be understood that these stations are conventional and that, if desired, the disc pack 174 can be assembled and tested for RVA attributes in semi-automatic, manually operated stations. For the purpose of the present disclosure, the important aspect here is the state of the disc pack 174 at this point of assembly as fed to the novel balance measurement station 148 which will now be described.

Figure 4:
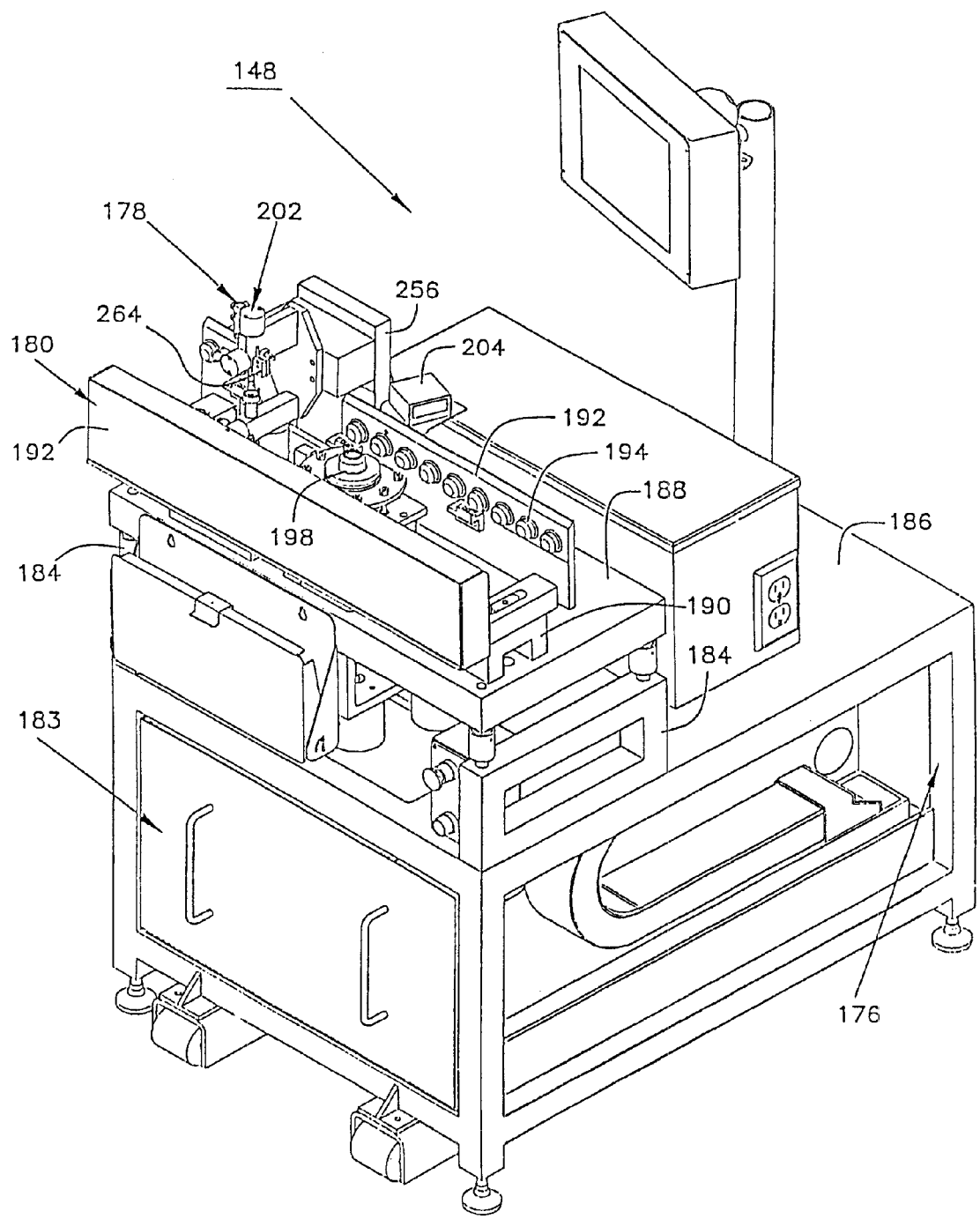
FIG. 4 is an isometric view of an automated balance measurement station which forms a part of the disc drive assembly line of FIG. 2.

Turning to FIG. 4, the balance measurement station 148 of the disc drive assembly line 138 has a framework 176 which supports a balance measurement assembly 178 and a conveyor assembly 180, the framework 176 furthermore providing an enclosure 183 for a station control computer (not shown). A pair of upright supports 184 are supported on a top surface 186 of the framework 176. The supports 184 support a baseplate 188 which, in turn, supports both the conveyor assembly 180 and the balance measurement assembly 178. A pair of opposing supports 190 are interposed between the side rails 192 of the conveyor assembly 180 for support thereof. The side rails 192 support a plurality of powered rollers 194 which rollingly engage the pallet 166 (not shown).

Figure 5:
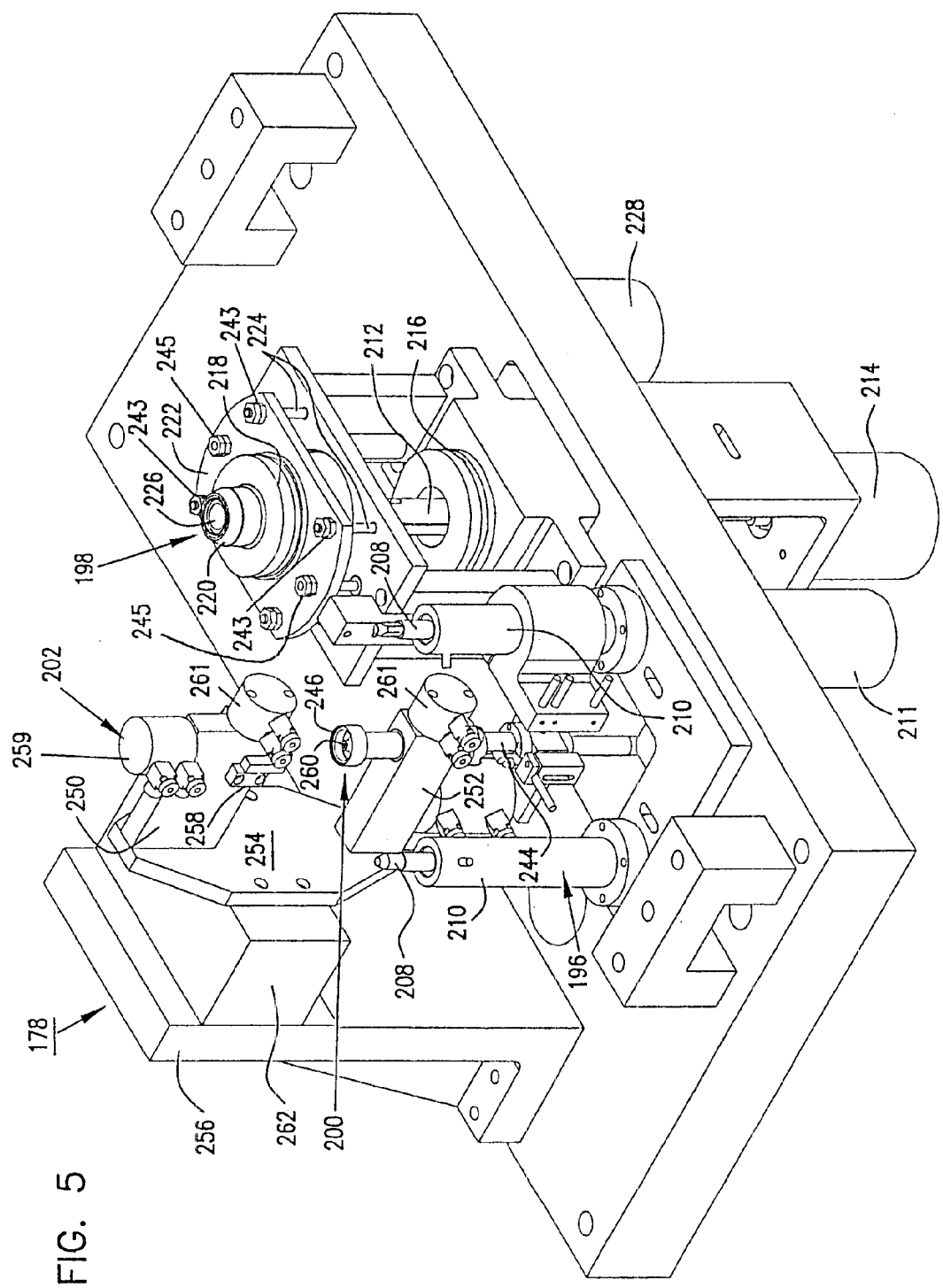
FIG. 5 is an isometric view of a portion of the automated balance measurement station of FIG. 4.

FIG. 5 more clearly shows the balance measurement assembly 178 of the disc drive assembly line 138, and it will be noted that the balance measurement assembly 178 has the following major components: a pallet 166 locator assembly 196; a rotary positioner assembly 198; a motor power assembly 200; and a balance head assembly 202.

The pallet 166 containing the disc pack 174 and other assembly components is conveyed by the conveyor assembly 180 into the balance measurement station 148. A bar code scanner 204 (see FIG. 4) reads the bar code label 172 on the pallet 166 and communicates with the station control computer (not shown) which queries the production system computer to determine the product type to be assembled and to verify that the particular pallet 166 is approved for processing. If the partially assembled disc drive 100 has failed any upstream testing, the production control computer (not shown) will not approve further processing and the pallet 166 will be passed through the balance measurement station 148 without further value-added processing.

If approved, the pallet 166 moves forward until a sensor (not shown) detects the pallet 166 and the station control computer (not shown) signals to pause the conveyor assembly 180. The rotary positioner assembly 198 rotationally orients the disc pack 74 for proper alignment with an electrical supply apparatus for powering the disc pack 174 during functional testing. The rotary positioner assembly 198 has a shaft 212 that is extensible by a cylinder 214, the shaft 212 supported for rotation by a lower bearing 216 and an upper bearing 218. A distal end of the shaft 212 is attached to and rotates a housing 220. It will be noted that the upper bearing 218 is supported by a movable support plate 222, which, in turn, is guided by guide rods 224. The housing 220 has an inner core which supports a fiber optic sensor 226. The shaft 212 is rotated by a stepper motor 228 which operably engages the shaft 212 by way of an interconnecting belt (not shown).

Turning now to FIGS. 6 and 7, it will be noted that the spindle motor 106 has a motor housing 230 which supports an outer race 232, where the motor housing 230 and outer race 232 together spin freely around a stationary shaft 234 by way of interior roller bearings (not shown) therebetween. The shaft 234 has a threaded shoulder 236 which encloses three electrical contacts 238 that are internally connected to the windings (not shown) of the spindle motor 106. The electrical contacts 238 are equally distributed in a common radial plane, as are three indicating apertures 240 in an end face 242 of the shoulder 236, each of the indicating apertures 240 being adjacent to one of the electrical contacts 238.

Returning now to FIG. 5, the support plate 222 is raised up against the stop nuts 243 by two air cylinders 245 which in turn raises the housing 220, the shaft 212, and the sensor 226. The housing 220 engages the bushing in the pallet 166 to locate it. In this position, the sensor 226 mounted in the shaft 212 is just below the surface of the spindle motor 106. The shaft 212 is rotated by the stepper motor 228, which rotates the sensor 226 tinder the spindle motor 106. The sensor 226 rotates through 120 degrees searching for the holes 240 in the spindle motor 106. When one of the holes 240 is located, the shaft 212 is lifted by air cylinder 214 to lift the spindle motor 106 out of the pallet 166. The spindle motor 106 is rotated to orient the motor pins 238 with the electrical contacts in the balance measurement assembly 178. The spindle motor 106 is returned to the pallet 166 by disengaging the air cylinder 214.

The pallet locator assembly 196 has a pair of locking pins 208 that are each slidable mounted in a linear bearing 210 and attached to a distal end of an extensible cylinder 211 (only one shown) so that when the cylinders 211 are extended the locking pins 208 engage bushing apertures (not shown) in the bottom-side of the pallet 166. This second position of the pallet 166 places the disc pack 174 adjacent the motor power assembly 200 which supports and powers the disc pack 174.

The motor power assembly 200 has an extensible shaft 244 that is extended by a cylinder (not shown). A distal end of the shaft 244 has a gripping ring 246 that pressingly engages the shaft 234 of the spindle motor 106. The shaft 244 raises the disc pack 174 upward off the pallet 166, and into opposing engagement with a tapered mandrel (not shown) which engages a central aperture 248 (FIGS. 8 and 9) in the top side of the shaft 234. The tapered mandrel is supported by a top block 250 and the shaft 244 is supported by a bottom block 252, both blocks 250, 252 being connected to a common web member 254 which is, in turn, mounted to the balance transducer 262, which is mounted to a support 256. In this manner the disc pack 174 is clamped on both ends of the motor shaft 234 so that the discs 108 are free to rotate thereabout. It will be noted that the tapered mandrel (not shown) is guided by guides 258 to prevent it from rotating and is moved up and down by air cylinder 259 to variably position the tapered mandrel relative to the gripping ring 246 to compensate for different heights of the disc pack 174. After the disc pack 174 is clamped, the shaft 244 and the tapered mandrel (not shown) are clamped by the air cylinders 261 to prevent movement of the shaft 244 and tapered mandrel (not shown) during the test.

Tile shaft 244 has a set of retractable power supply leads 260 that are aligned with the electrical contacts 238 when the spindle motor 106 is in the reference position as provided by the rotary positioner assembly 198 and discussed previously. In this manner, the motor power assembly 200 provides electrical power to spin the disc pack 174. With the disc pack 174 thus clamped and spinning, the balance head assembly 202 has conventional transducers which determine the amount of dynamic imbalance present in the spinning disc pack 174. The balance head assembly 202 consists of the fixture described above and a conventional two-plane balance measurement mechanism, with transducers 262 providing a measurement of imbalance in two planes (top and bottom of the disc pack 174). The two-plane balance measurement mechanism is of conventional construction and well known to one skilled in the art, such as a two-plane balancer made by American Hoffman model HDR11.1/SEK. Also included in the balance head assembly 202 is a timing mark sensor 264 (see FIG. 4) that senses the timing mark 266 (see FIG. 8) to maintain a constant rotational speed during measurements, and tracks the relative position of the timing mark 266 for phase angle calculation by the station control computer (not shown). The phase angle of the net imbalance and the size of counter-weights that are required to bring the disc pack 174 into compliance with the balance requirements of the disc drive design specification are calculated in a conventional manner by the station control computer. The phase angles are referenced from the timing mark 266. The station control computer (not shown) reports the magnitude and phase angle of disc pack 174 imbalance to the production control computer.

After the imbalance has been measured and transmitted to the production system computer for future use by a downstream assembly station, the disc pack 174 is de-energized and the shaft 244 retracts to return the disc pack 174 to the pallet 166. The station control computer signals release of the pallet 166. If space in the queue is available on the transfer conveyor 168 (FIG. 2) the station control computer (not shown) activates conveyor assembly 180 to advance the pallet 166. The rotary transfer conveyor 170 transfers the pallet 166 to the transfer conveyor 168. Should the queue be full, the station control computer awaits a signal from the production system computer for clearance before releasing the pallet 166.

Balance Correction Station

Figure 10:
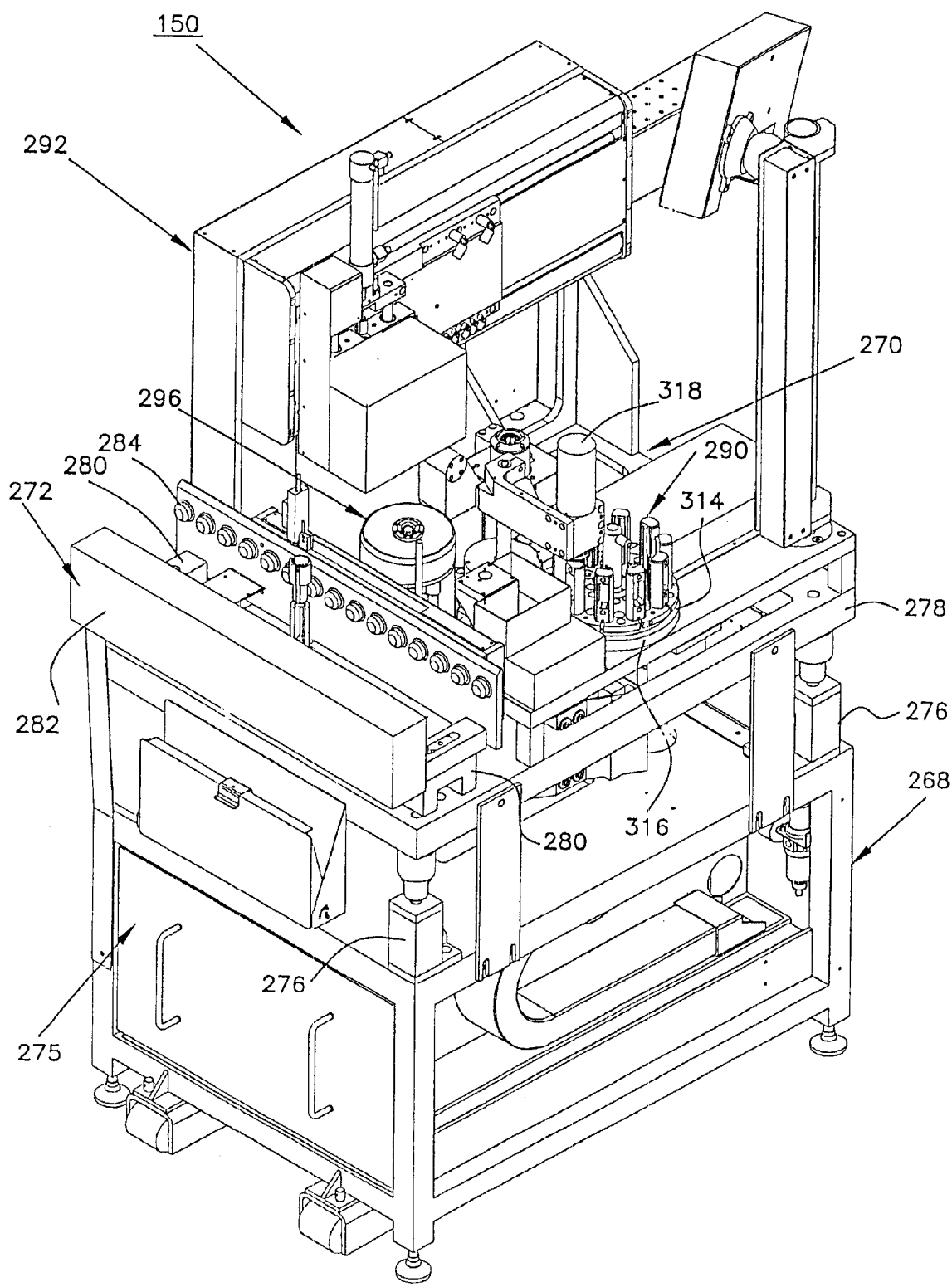
FIG. 10 is an isometric view of the balance correction station which forms a part of the disc drive assembly line of FIG. 2.

Turning now to FIG. 10, shown therein is the balance correction station 150 which receives information from the production system computer regarding the magnitude and phase angle of the imbalance of the disc pack 174, as determined by the balance measurement station 148. It will be noted that a framework 268 provides support for a balance correction assembly 270 and a conveyor assembly 272, and further provides an enclosure 275 for a station control computer (not shown).

Upright supports 276 support a baseplate 278 that, in turn, supports both the conveyor assembly 272 and the balance correction assembly 270. A pair of opposing supports 280 are interposed between the side rails 282 of the conveyor assembly 272 for support thereof. The side rails 282 support a plurality of powered rollers 284 which rollingly engage the pallet 166, not shown in this figure, for advancement thereof.

Figure 11:
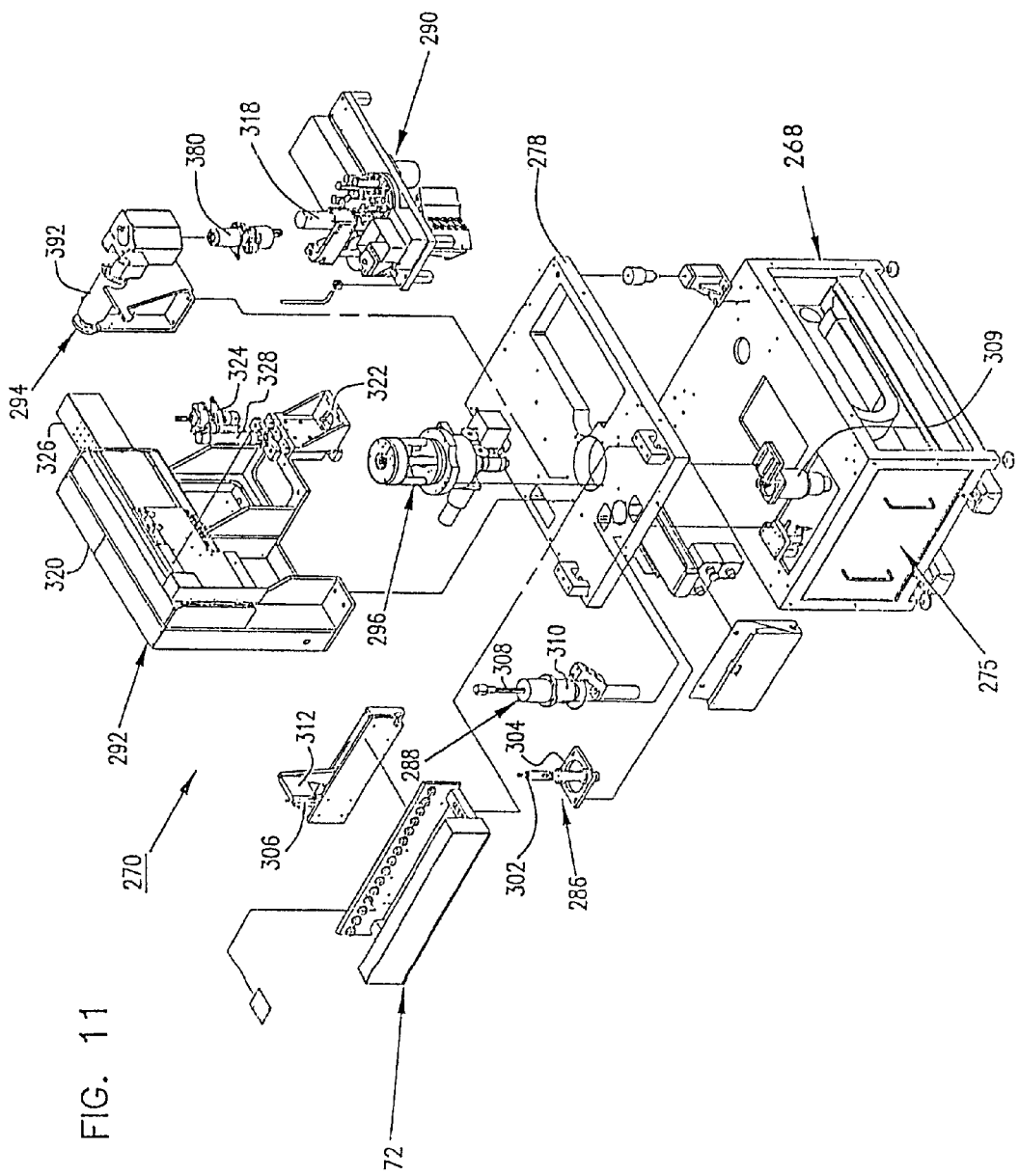
FIG. 11 is a partial exploded isometric view of the balance correction station of FIG. 10.

FIG. 11, a generally exploded view of the balance correction assembly 270, shows that the balance correction assembly 270 has the following major components: a pallet locator assembly 286; a rotary positioner assembly 288; a shim selector assembly 290; a transfer assembly 292; a flipping assembly 294; and a shim attachment assembly 296.

The pallet 166 is conveyed by the conveyor assembly 272 into the balance correction assembly 270. A scanner (not shown) reads the bar code label 172 on the pallet 166 to identify the product and to verify that the partially assembled disc drive 100 is approved for further processing. If the partially assembled disc drive 100 has failed any upstream testing, for instance, the production system computer will not approve further processing and the pallet 166 will therefore pass through the balance correction station 150 without further value-added processing.

An approved pallet 166 (not shown) is conveyed forward until a sensor ( not shown) detects the pallet 166 and pauses the conveyor assembly 272. The pallet locator assembly 286 has a pair of locking pins 302 (only one shown in FIG. 11) that are each mounted on a distal end of an extensible cylinder 304 so that when the cylinders 304 are extended the locking pins 302 engage bushings (not shown) in the bottom-side of the pallet 166.

With a pallet 166 approved and secured by the locking pins 302, the rotary positioner assembly 288 engages the disc pack 174 to raise the disc pack 174 to a position adjacent a timing mark sensor 306 to locate the timing mark 266 on the spindle motor 106 (FIG. 8). Based on the position of the timing mark 266, the shim attachment assembly 296 rotates the balance shim 314 (see FIG. 12) to a position relative to the timing mark 266 for a proper installation. In the embodiment shown in FIG. 11, the rotary positioner assembly 288 has a shaft 308 that is extensible by a cylinder 310. A motor 309 in cooperation with a chain (not shown) rotates the shaft 308 to rotationally position the disc pack 174. The timing mark sensor 306 is supported by an arm 312 which is mounted on an air driven slide (not shown). As the disc pack 174 is raised by the cylinder 310, the arm 312 positions the timing mark sensor 306 in radial alignment with the timing mark 266. The shaft 308 rotates the spindle motor 106 until the timing mark sensor 306 detects the timing mark 266. The location of the timing mark 266 is thus recorded and used in subsequent operations that are discussed below. After the timing mark 266 is found, the shaft 308 rotates to one of three positions so as to clearingly pass through the bushing 165 of the pallet 166. The cylinder 310 retracts to return the disc pack 174 to the pallet 166, and the arm 312 moves to the right to clear the disc pack 174.

From the bar code label 172 the station control computer queries the production system computer to retrieve data from the balance measurement station 148 which previously performed a dynamic balance measurement operation to determine the magnitude and the phase angle of dynamic imbalance. To offset the dynamic imbalance, the balance correction station 150 can attach one or two shims 314 (shown in FIG. 12), as necessary, to the spindle motor 106. A plurality of differently weighted shims 314 are stored and delivered for use by the shim selector assembly 290.

Returning to FIG. 10, the shim selector assembly 290 has a rotating carousel 316 which holds a number of differently weighted shims 314 on appropriately dimensioned vertically standing rod supports. The carousel 316 is rotated by a motor (not shown) to present the desired shim 314 to a pick and place robotic arm 318. The robotic arm 318 supportingly engages the desired shim 314 in the carousel 316, and with a vacuum assisted end effector (which is not shown but which is of conventional construction), picks the shim 314 from the carousel 316 and delivers the slim 314 to the shim attachment assembly 296.

The embodiment of the present invention as illustrated by FIG. 10 uses a carousel 316 which holds ten stacks of shims 314, so as many as ten differently weighted shims 314 can be stored in the carousel 316. From FIG. 12 it will be noted that the characteristic imbalance of a particular shim 314 is determined by the width of a gap 319 in the shim 314. For this embodiment of the invention it has been determined that weighted shims 314 ranging in imbalance from 11.9 mg-in. to 69.5 mg-in. provide a sufficient range of shim weights to successfully balance substantially all expected imbalance conditions within a specified maximum imbalance condition of 10 mg-in. per plane. For a farther discussion of the selection and use of weighted shims for balancing a disc pack see U.S. Pat. No. 5,555,144 entitled BALANCING SYSTEM FOR A DISC DRIVE DISC ASSEMBLY issued Sep. 10, 1996 to Wood et al., assigned to the assignee of the present invention.

Continuing with FIG. 11, the transfer assembly 292 picks the disc pack 174 from the pallet 166 and moves the disc pack 174 to the shim attachment assembly 296 for attachment of a selected shim 314 to the spindle motor 106. A top collet assembly 324 (FIG. 13) is utilized in conjunction with the transfer assembly 292 to maintain two important relational attributes of the disc pack 174. First, the rotational position of the timing mark 266 (on the spindle motor 106) must be maintained so that the shim 314 is installed relative to the timing mark 266. Also, a planar compliancy is necessary in engaging the disc pack 174 to accommodate for positional variation of the transfer assembly 292.

The transfer assembly 292 has a two-axis positioner 320 which positions a carrier 322, which in turn supports the top collet assembly 324 in a horizontal direction along a horizontal guide 326 and in a vertical direction along a vertical guide 328. The top collet assembly 324 is thus positioned above the disc pack 174 in the pallet 166 by the horizontal and vertical movement of the two-axis positioner 320. It will be noted that the top collet assembly 324 has a compliant mode, as discussed below, that provides for positive picking and positioning of the disc pack 174.

Figure 13:
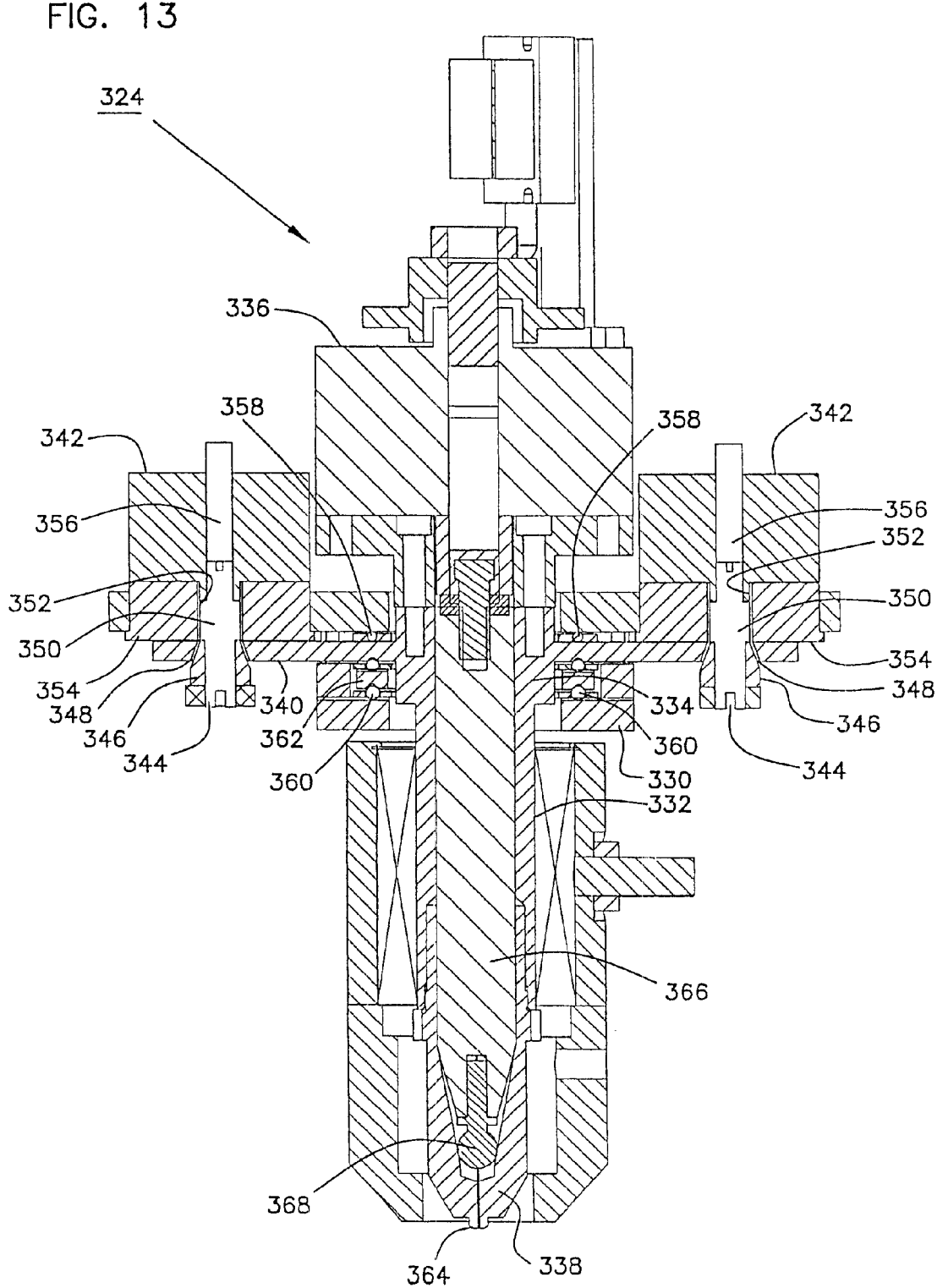
FIG. 13 is a partial sectional view of a compliant collet assembly of the balance correction station of FIGS. 10 and 11.

FIG. 13 is a partial sectional view of the top collet assembly 324 which has a fixed mode (depicted in FIG. 13) and an alternative compliant mode. The top collet assembly 324 is mounted to the carrier by a leveling plate 330. A collet 332 is attached at a first end 334 to a cylinder 336, the top collet assembly 324 having a segmented end 338. A flange portion 340 of the collet 332 extends radially and is constrained by a pair of locking cylinders 342. In the fixed mode, the collet 332 remains positionally fixed relative to the leveling plate 330. In the compliant mode, the collet 332 has a two-axis freedom of movement relative to the leveling plate 330, but the collet 332 does not rotate. The compliant mode provides for a self-centering of the top collet assembly 324 relative to the disc pack 174, while preventing rotation of the collet 332 so as to maintain the reference position of the timing mark 266.

In the fixed mode, each of the locking cylinders 342 retracts a shaft 344 to engage a tapered lower pad 346 into a dimpled aperture 348 formed by the flange portion 340 of the collet 332. In the retracted mode, the shaft 344 has a shaft portion 350 that enters a passageway 352 in an upper pad 354 with a closely fitting relationship therebetween. The position of the locking cylinders 342 is thus fixed and determined by the disposing alignment of the shaft portion 350 within the passageway 352. The position of the collet 332 is thus fixed and determined by the wedging engagement of the lower pad 346 against the flange portion 340.

In the compliant mode, each of the locking cylinders 342 extends the shaft 344 to disengage the lower pad 346 from the flange portion 340. In the extended mode the shaft portion 350 is clearingly moved out of the passageway 352 so that a reduced diameter portion 356 allows movement of the collet 332 relative to the leveling plate 330 which is positionably fixed to the carrier 322.

In the compliant mode the collet 332 is free to move in the two-axis plate that is parallel to the plane of the surface of the disc pack 174 that is engaged. The flange portion 340 slidingly engages the cylinder 336 with a plurality of ball bearings 358 disposed therebetween. A second set of ball bearings 360 cooperate with a center race 362 to limit the compliant motion to orthogonal movements in the x and y axis directions, thus preventing rotary motion of the collet 332 in order to maintain the reference position of the timing mark 266 on the disc pack 174.

It will be noted from FIG. 13 that the top of the leveling plate 330 and the bottom of the center race 362 (as depicted in FIG. 13) have parallel grooves for receivingly engaging the ball bearings 360. It will further be noted that the bottom of the flange portion 340 and the top of the center race 362 have parallel grooves, such grooves being orthogonal to the grooves of the leveling plate 330 and the top of the center race 362, for receivingly engaging ball bearings 360. This combination of orthogonal grooves in opposing surfaces allows orthogonal movement, but rotational forces will be resisted as shear forces on the ball bearings 360.

When the top collet assembly 324 is in the compliant mode and positioned above the disc pack 174 by the two-axis positioner 320, a tip 364 formed by the segmented end 338 is in position to engage the disc pack 174 in the pallet 166. It should be noted that both the tip 364 and the central aperture 248 have chamfered leading edges to urge the tip 364 into the central aperture 248.

Once the tip 364 is disposed within the central aperture 248, the cylinder 336 is energized to extend an actuator pin 366 which, in turn, moves a tooling ball 368. The tooling ball 368 moves downward and engages the segmented end 338 of the collet 332, causing the segmented end 338 to diametrically expand. This results in the segments of the segmented end 338 pressingly engaging and imparting a radial force on the walls of the central aperture 248 sufficient to supportingly engage the disc pack 174.

It will be noted from FIG. 11 that the two-axis positioner 320 lifts the disc pack 174 upward and away from the pallet 166. After clearing the pallet 166, the locking cylinders 342 are energized to draw the lower pad 346 against the flange portion 340 of the collet 332. This locking of the locking cylinders 342 moves the collet 332, and hence the disc pack 174, to a reference position of a known positive registration relative to the two-axis positioner 320.

Figure 14:
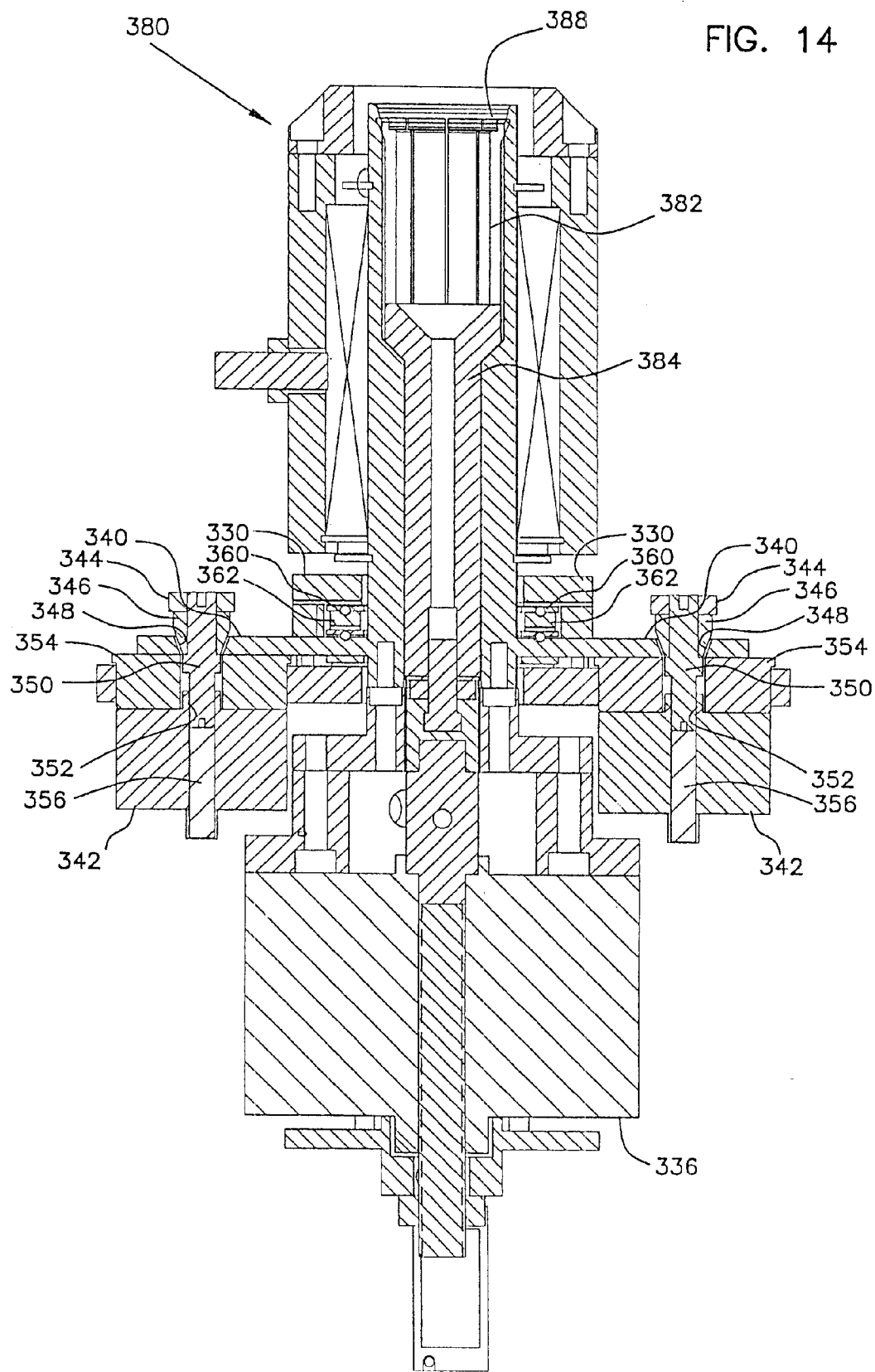
FIG. 14 is a partial sectional view of another compliant collet assembly of the balance correction assembly of FIGS. 10 and 11.

The disc pack 174 is moved to the flipping assembly 294 above a bottom collet assembly 380 (shown in FIG. 14) of the flipping assembly 294. The bottom collet assembly 380 is similar to the top collet assembly 324, the exception discussed below. Because of this similarity the same number designations are used in FIG. 14 to designate identical components as such components are numerically designated in FIG. 13. The difference between the two collets is that the bottom collet assembly 380 has an outside diameter gripping collet 384 rather than an inner diameter gripping collet like the top collet assembly 324. FIG. 14 shows that the bottom collet assembly 380 has a segmented end 382 of a collet 384 that, when the cylinder 336 is retracted, causes a tip opening 388 to grip the outside diameter of the shoulder 236 portion of the spindle motor 106 (FIG. 7). As the two-axis positioner 320 lowers the disc pack 174 into the flipping assembly 294 both the top collet assembly 324 and the bottom collet assembly 380 switch to the compliant mode. After the shoulder 236 portion of the spindle motor 106 has been gripped by the tip 388 of the bottom collet assembly 380, the top collet assembly 324 withdraws and the bottom collet assembly 380 switches to the fixed mode.

The flipping assembly 294 has a rotary actuator 392 which positions the bottom collet assembly 380 in a fixed position above the shim attachment assembly 296 in order to place the selected shim 314 on the clamp ring 110 of the disc pack 174.

Figure 15:
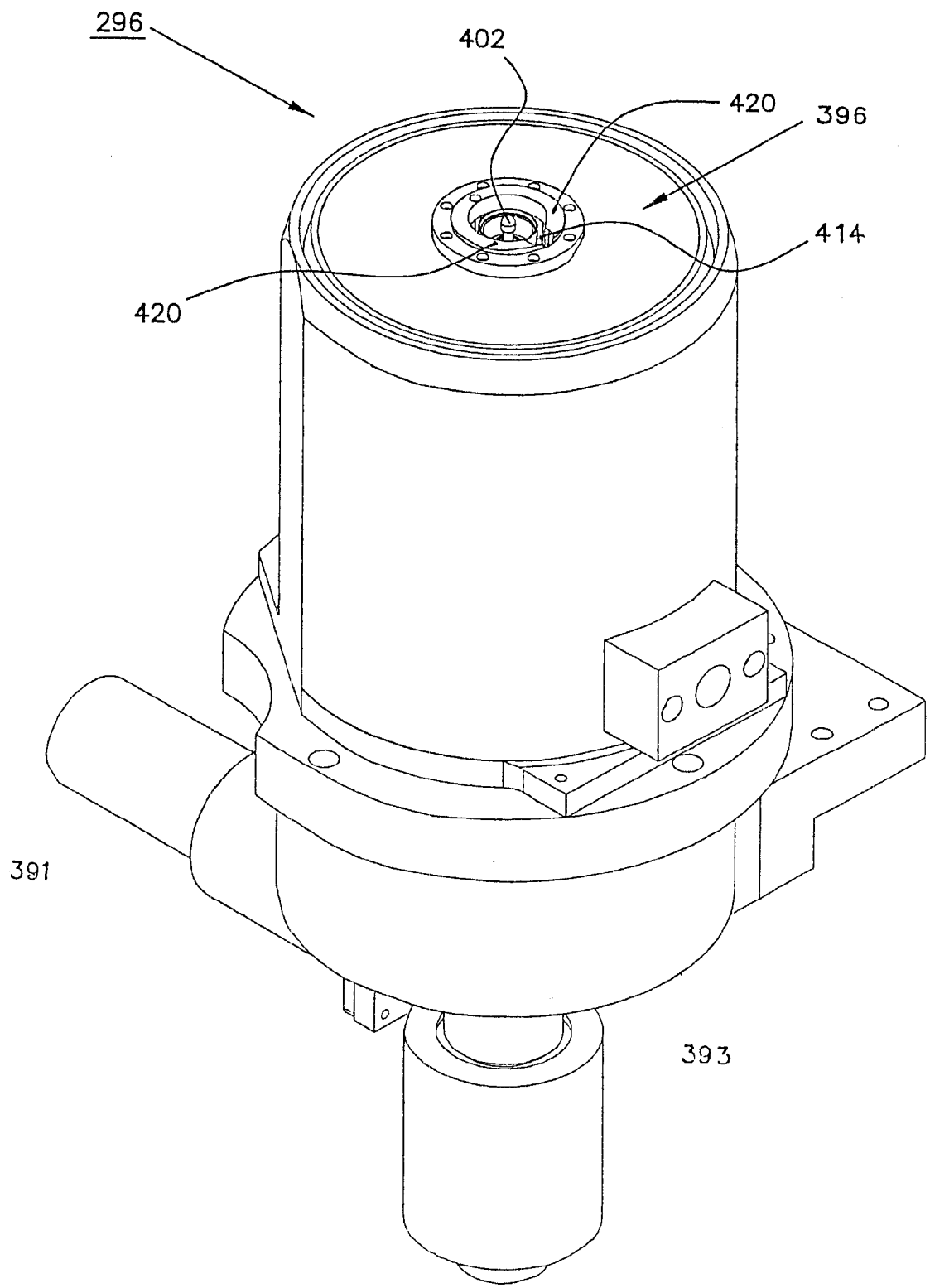
FIG. 15 is an isometric view of the shim attachment assembly of the balance correction station of FIGS. 10 and 11.
Figure 16:
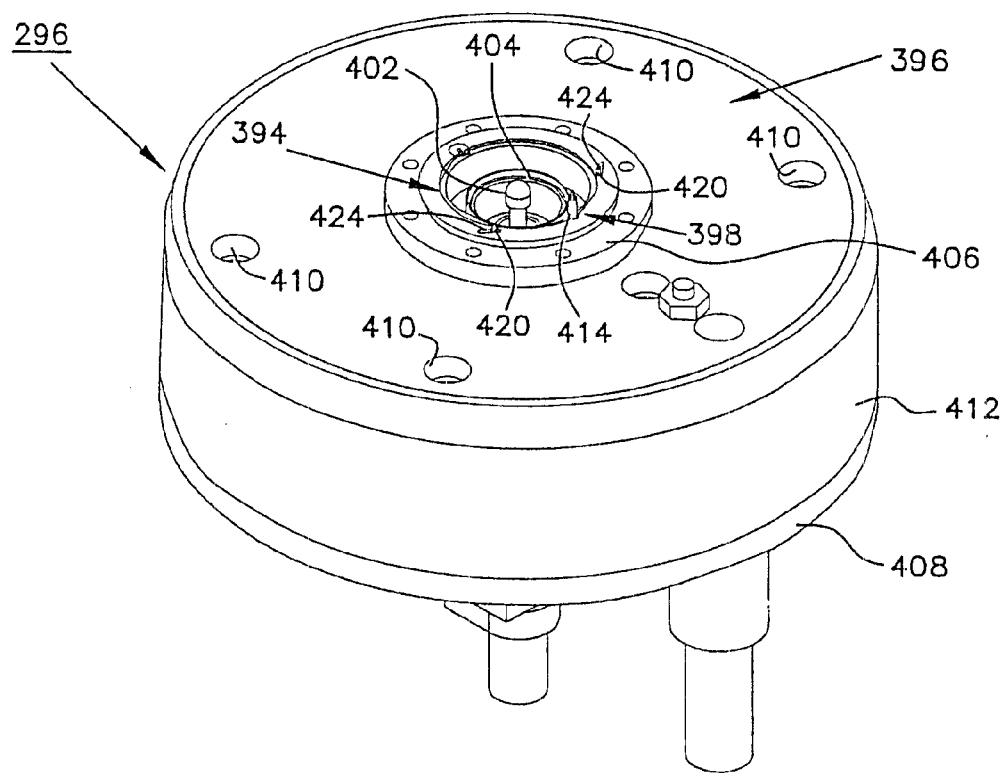
FIG. 16 is an isometric view of a portion of the shim attachment assembly of FIG. 15.
Figure 17:
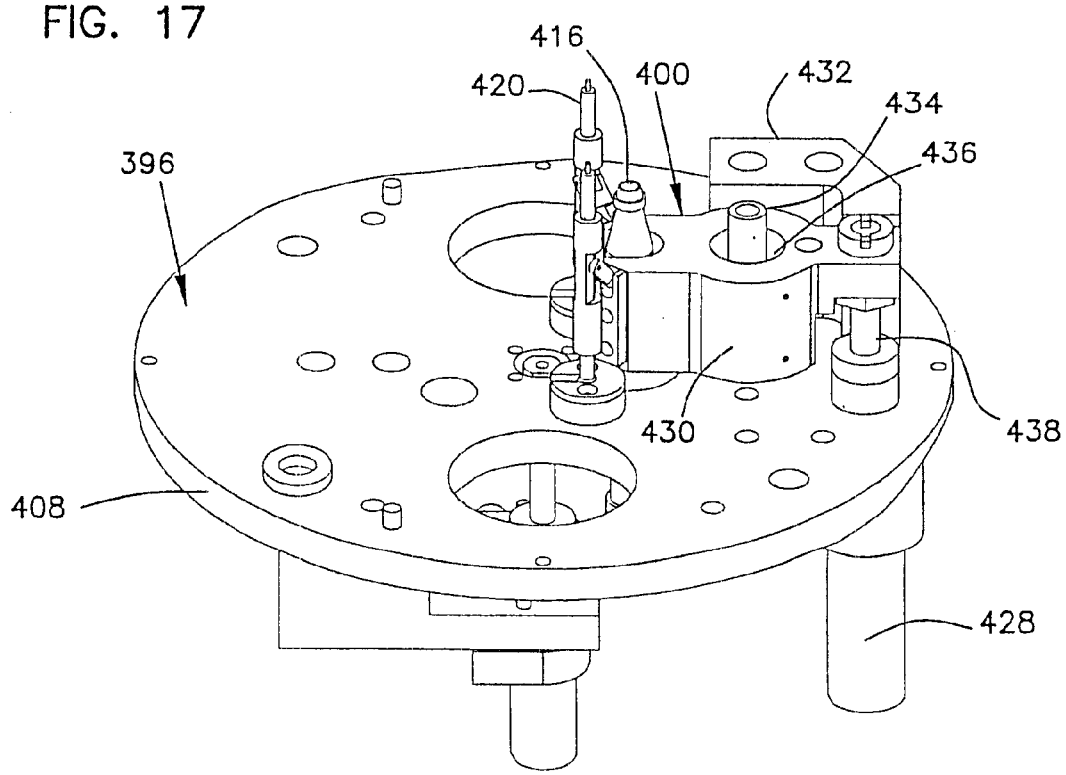
FIG. 17 is an isometric view of the shim attachment assembly of FIG. 16, with the pin guide and shroud removed to show the shim spreader assembly.

FIG. 15 is an isometric view of the shim attachment assembly 296 which receives the shim 314 from the shim selector assembly 290, and rotationally positions the shim 314 relative to the timing mark 266 for proper dynamic balance. The shim attachment assembly 296 has a stepper motor 391 which supports a conventional pinion gear (not shown) that engages a conventional rack gear (not shown) in order to linearly advance a shaft 393 which supports a platform assembly 396. In this manner, the shim attachment assembly 296 moves the shim 314 vertically until the shim 314 is correctly positioned adjacent the spindle motor housing 230, and attaches thle shim 314 to the spindle motor 106. If necessary, one of the shims 314 is attached to each end of the spindle motor 106 to dynamically balance the disc pack 174. FIGS. 16 and 17 show the major components of the shim attachment assembly 296 to be as follows: a positioning assembly 394; the rotating platform assembly 396; a guidance control assembly 398; and a shim spreader assembly 400.

As shown in FIGS. 15 and 16, the positioning assembly 394 has a spring-loaded centering mandrel 402 which is radiused at a leading end thereof to engage the central aperture 248 of the spindle motor 106 to center the spindle motor 106 relative to the shim 314. After the flipping assembly 294 has inverted the disc pack 174 so that the central aperture 248 of the spindle motor 106 is adjacent the centering mandrel 402, the bottom collet assembly 380 switches to the compliant mode. In this manner the disc pack 174 is centered with respect to a shim 314 that is supported for attachment by the shim attachment assembly 296.

As will be clear below, the shim attachment assembly 296 can also attach a shim 314 to the bottom end of the spindle motor 106. In doing so, the positioning assembly 394 provides for retraction of the centering mandrel 402, by way of a spring-loaded cylinder (not shown), so that the centering mandrel 402 is operably recessed below a centering ring 404 which receivingly engages the shoulder 236 of the spindle motor 106 so as to likewise center the disc pack 174 with respect to a shim 314 during attachment thereof to the bottom of the spindle motor 106.

Figure 19:
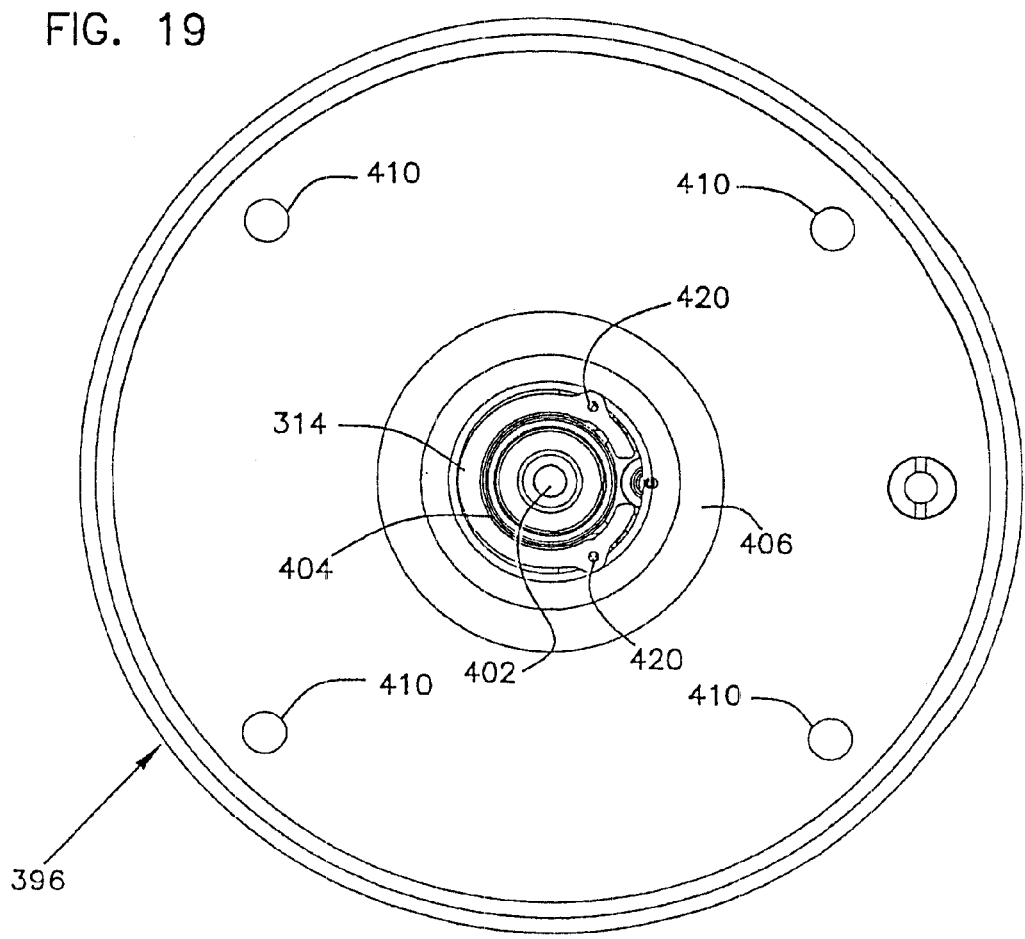
FIG. 19 is a top view of the shim attachment assembly of FIG. 15.

Disposed generally about the positioning assembly 394 is the rotating platform assembly 396 which supportably rotates the shim 314 (see FIG. 19) for attachment to the spindle motor 106. The rotating platform assembly 396 is positioned by the motor 309 (see FIG. 11) and chain (not shown) which is trained over both the shaft 308 and the rotating platform assembly 396. Rotation of the shim 314 is necessary in order to attach the shim 314 in alignment with the phase angle of dynamic imbalance as determined by the balance measurement station 148. The positioning assembly 394 has a pin guide 406 and a lower plate 408 which are maintained in spaced-apart relation by a number of fasteners (not shown) which pass through apertures 410 in the pin guide 406. A shroud 412 surrounds the pin guide 406 and the lower plate 408 to minimize the disbursement of particulates that are generated by the shim spreader assembly 400 during operation.

Figure 20:
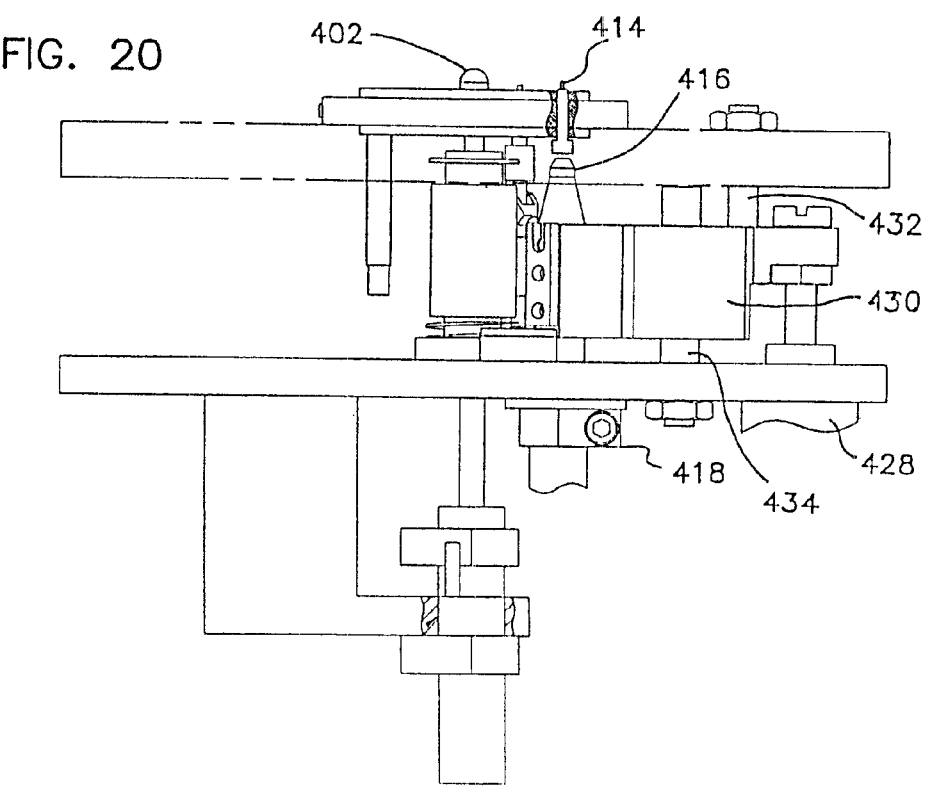
FIG. 20 is a partially cutaway, elevational view of the shim attachment assembly of FIG. 19.

The guidance control assembly 398 has a plunger 414 which engages a linear voltage displacement transducer 416 (hereinafter sometimes referred to as the "LVDT"). The LVDT 416 is positionable by a supporting bracket 418 (see FIG. 20) and provides position feedback of the distance from the top of the shim 314 to the bottom of the motor surface where the shim is going to be installed. The shim spreader assembly 400 opens the shim 314 and moves tip the distance calculated by the position feedback and closes the shim 314 on the spindle motor 106.

Figure 12:
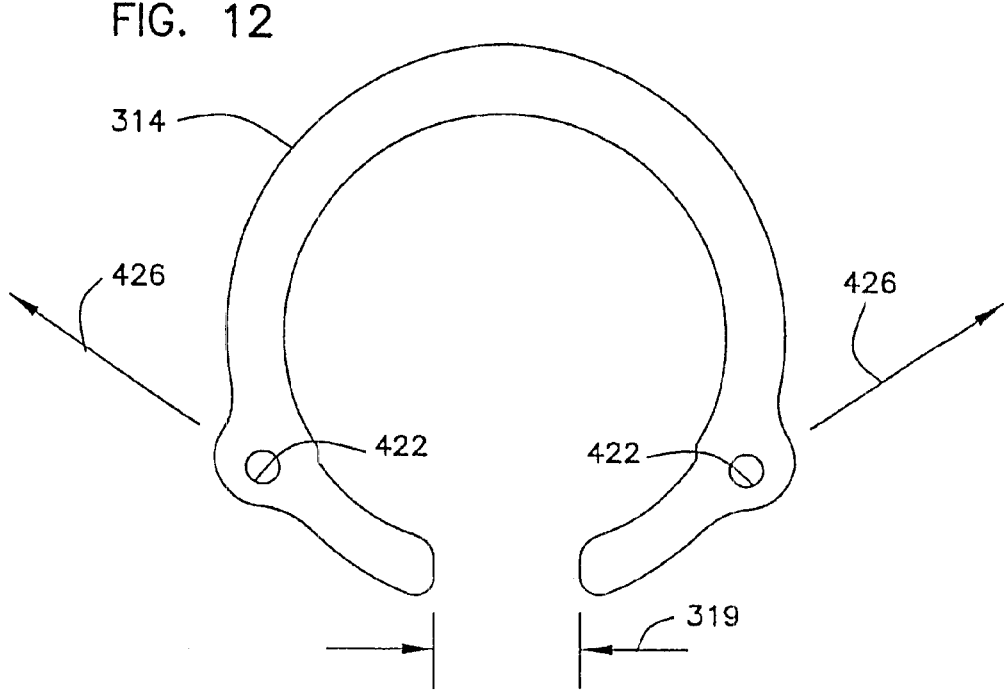
FIG. 12 is a top view of a shim used by the balance correction station to dynamically balance the disc park.

The shim spreader assembly 400 has a pair of spreader pins 420, each of which having a portion thereof that extends above the pin guide 406 to engage an aperture 422 in the shim 314 (see FIG. 12). The spreader pins 420 are constrained within guiding slots 424 formed in the pin guide 406. The guiding slots 424 guide the spreader pins 420 in opposing directions shown by directional arrows 426 in FIG. 12, so that as the shim 314 is spread open, the center of the shim 314 inner diameter remains substantially fixed and centered with respect to the positioning assembly 394.

FIG. 17 is a view of a portion of the rotating platform assembly 396 with the pin guide 406 and the shroud 412 removed to better illustrate the support and operation of the shim spreader assembly 400. An air cylinder 428 moves the slider 430 up and down. The slider 430 is constrained to vertical motion by a pair of opposing glides 432 (only one shown for clarity) and a guide rod 434 which is slidingly disposed within an aperture 436 in the slider 430.

Figure 18:
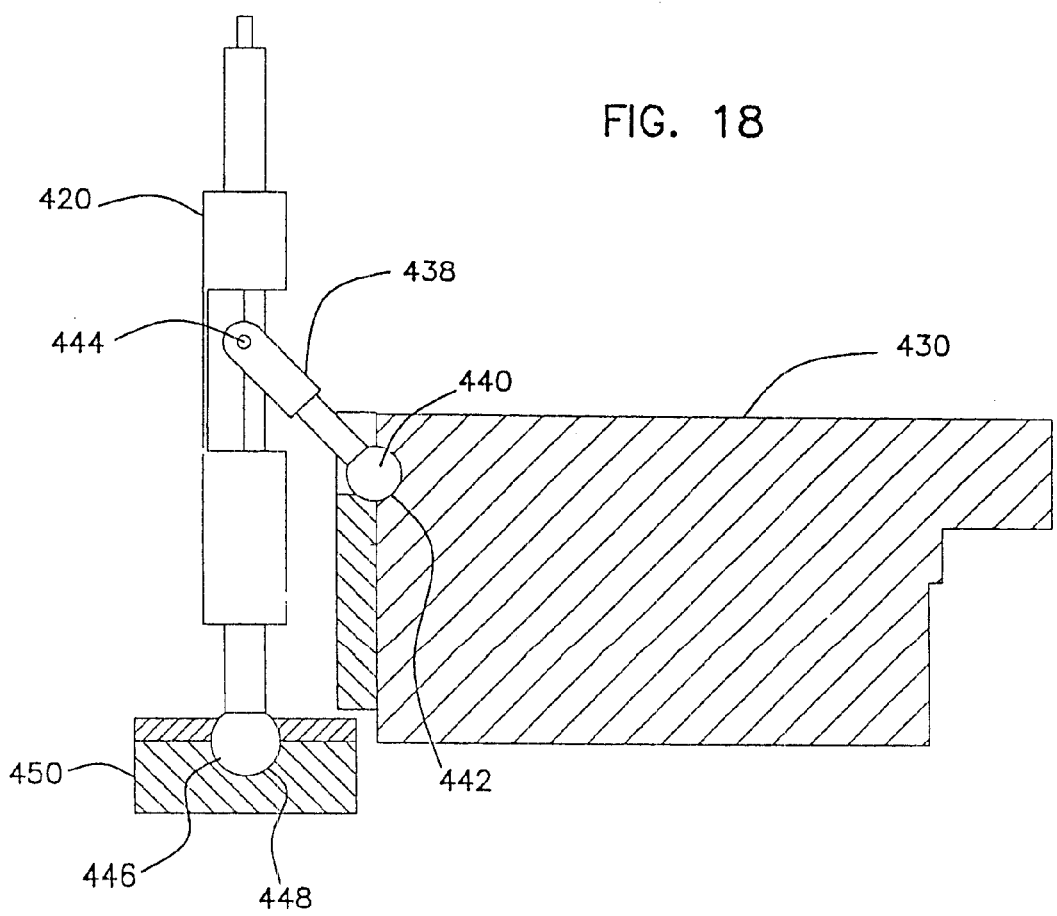
FIG. 18 is a partial sectional view of a spreader pin of the spreader assembly of FIG. 17.

FIG. 18 is a partial sectional view showing the manner in which the slider 430 is linked by a linkage 438 to each of the spreader pins 420, so that vertical movement of the slider 430 imparts articulating movement to the spreader pins 420. The linkage 438 has a ball 440 at a first end that is receivingly disposed in a socket 442 of the slider 430. The distal end of the linkage 438 is joined by a pin 444 to a medial portion of the spreader pin 420. At a lower end the spreader pin 420 has a ball 446 that is disposed within a socket 448 in a base member 450 that is attached to the lower plate 408. FIG. 18 represents the relationship of mating components of the shim spreader assembly 400 when the cylinder 428 is retracted, and thus the LVDT 416 has not been triggered by the presence of a spindle motor 106. When a spindle motor 106 does displace the LVDT 416 sufficiently so that the station control assembly energizes the cylinder 428, an upward motion of the slider 430 imparts an outward motion of the spreader pins 420, in the direction of arrow 426 as shown in FIG. 12.

It should be noted that the cylinder 428 has three modes. The first mode retains the spreader pins 420 in a home position awaiting the placement of shim 314. The second mode moves the spreader pins 420 to an open position which spreads open the shim 314. The third position is a null position which allows the spreader pins 420 to float freely. The null position of cylinder 428 is used during the time the disc pack 174 is being removed from the shim spreader assembly 400 to minimize the amount of resistance from friction between the spreader pin 420 and the shim 314.

In this manner the disc pack 174 is advanced to a fixed position above the shim attachment assembly 296 by the flipping assembly 294 for the attachment of the selected shim 314 to dynamically balance the disc pack 174. Prior to the arrival of the disc pack 174, the robotic arm 318 has already picked the shim 314, as delivered thereto by the carousel 316, and delivered the shim 314 to the pin guide 406. In placing the shim 314 onto the pin guide 406, the robotic arm 318 and the rotating platform assembly 396 cooperate to matingly align the spreader pins 420 with the apertures 422 of the shim 314.

Briefly summarizing, the shim attachment assembly 296 rotates to orient the shim 314 relative to the timing mark 266 on the spindle motor 106 to provide the appropriate dynamic balance, as prescribed by the balance measurement station 148. After the shim 314 is attached, the motor 391 delivers the centering mandrel 402 of the positioning assembly 394 into pressing engagement with the top end of the spindle motor 106. As described previously, the bottom collet assembly 380 is in the compliant mode so that the spindle motor 106 is able to seek the center of the positioning assembly 394 by the cooperation of the centering mandrel 402 and the central aperture 248.

The LVDT 416 controls the upward advancement of the shim attachment assembly 296 to a reference position, whereupon the shim attachment assembly 296 is advanced to a desired location where there is about 0.050" clearance between the spindle motor 106 and the shim 314. Thus the spindle motor 106 is very nearly touching the shim 314 before the shim 314 is spread open. In this manner the spindle motor 106 provides a backing surface for the shim 314 should any buckling of the shim 314 occur during spreading.

After the shim attachment assembly 296 is in the desired backing position, the cylinder 428 is energized to activate the shim spreader assembly 400. The shim attachment assembly 296 finally positions the shim 314 so that the clamp ring 110 is substantially in coplanar alignment with the shim 314. At that time the cylinder 428 switches to the null mode which allows the shim 314 to spring closed and clamp around the clamp ring 110. Finally, the shim attachment assembly 296 is withdrawn from the disc pack 174 a short distance, while the rotating platform assembly 396 rotates the LVDT, and then moves to a reference position to verify that the shim 314 is attached substantially squarely on the spindle motor 106. When the measurement is satisfactorily completed, the shim attachment assembly 296 is withdrawn from the disc pack 174.

With the shim 314 in place, the flipping assembly 294 returns the disc pack 174 to the unrotated position. The transfer assembly 292 positions the top collet assembly 324, which is in the compliant mode, into supporting engagement of the disc pack 174. The bottom collet assembly 380 releases and the disc pack 174 is lifted out of the flipping assembly 294 and the bottom of the disc pack is moved, as necessary, to a fixed position above the shim attachment assembly 296.

With the shim attachment assembly 296 approaching the disc pack 174, the centering mandrel 402 is retracted to provide the centering ring 404 for mating alignment with the shaft 234 of the spindle motor 106. As described before, the centering ring 404 and shaft 234 cooperate to position the spindle motor 106 in alignment with a second shim 314 that has been selected and delivered to the pin guide 406. In the same manner as for the top of the motor, the shim 314 is rotated and attached to a receiving groove 452 of the spindle motor 106 (FIG. 7). The second shim 314 is delivered to the shim spreader assembly 400 during the time interval that the disc pack 174 is being transferred from the flipping assembly 294 to the top collet assembly 324.

Once one or two of the balancing shims 314 have been attached to the bottom and top of the spindle motor 106, as needed, the transfer assembly 292 returns the disc pack 174 to the pallet 166, and the pallet 166 is released by the pallet locator assembly 286 to be conveyed to the balance verification station 152.

Balance Verification Station

From the balance correction station 150 the pallet 166 containing the disc pack 174 and other assembly components is conveyed to the balance verification station 152, the next station in line in the disc drive assembly line 138. The balance verification station 152 is in every respect structurally and functionally identical to the balance measurement station 148 described hereinabove. For this reason it will not be necessary to provide a detailed description of the balance verification station 152.

The balance verification station 152 repeats the tests performed by the balance measurement station 148 to determine whether the attachment of the weight slims 314, as specified by the balance measurement station 148 and applied by the balance correction station 150, has reduced the magnitude of dynamic imbalance of the disc pack 174 to an acceptable level which falls below the specified limit. If so, the disc pack 174 is released from the balance verification station 152 and conveyed to the merge station 154 for further processing.

If the magnitude of imbalance is above the specified limit, however, the station control computer of the balance verification station 152 reports to the production system computer which, in turn, broadcasts a rejection of the particular pallet 166 so that no further value-added work is performed on the disc drive 100.

Head-Disc Merge Station

Figure 21:
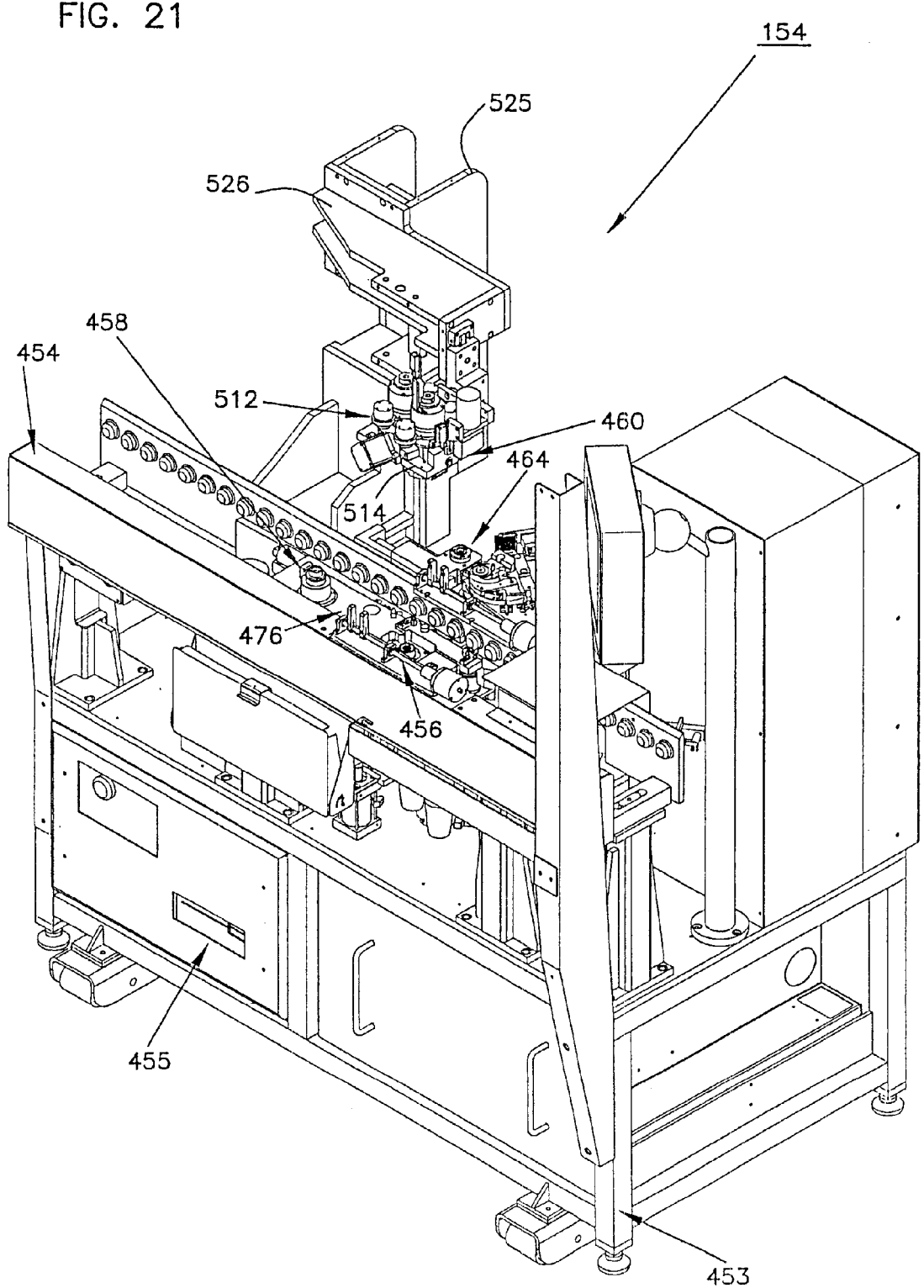
FIG. 21 is an isometric view of a head-disc merge station of the disc drive assembly line of FIG. 2.

The pallet 166 holding the disc pack 174 is conveyed for processing at the merge station 154 in the disc drive assembly line 138. FIG. 21 shows the merge station 154 which automatically merges the disc pack 174, the E-block 112, and the magnet assembly 126.

Figure 22:
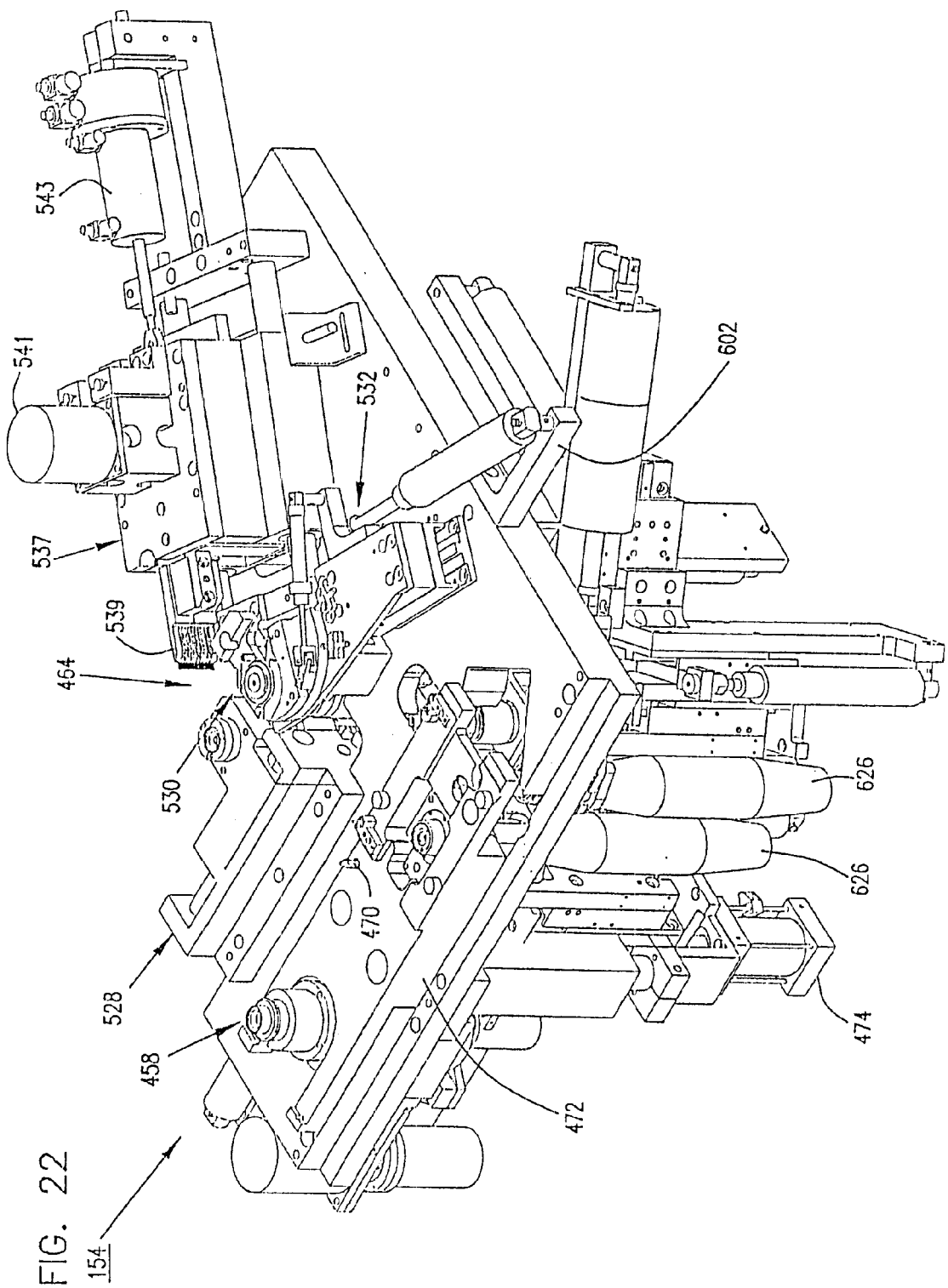
FIG. 22 is an isometric view of a portion of the head-disc merge station of FIG. 21.

It will be noted that a framework 453 supports a conveyor assembly 454 and provides an enclosure 455 for a station control computer (not shown). Also supported by the framework 453 is a number of major components, as follows: a basedeck positioning assembly 456; a pack nest assembly 458; a transfer assembly 460; and a merge assembly 464. FIG. 22 more clearly shows several of the components of the merge station 154.

The pallet 166 is conveyed into the merge station 154 by the conveyor assembly 454. A scanner (not shown) reads the bar code label 172 on the pallet 166 to identify the product being assembled and to verify that the particular partially assembled disc drive 100 is approved for further processing. If the disc pack 174 has failed any upstream testing, the production system computer will in effect reject the disc drive 100 and the pallet 166 will pass through the merge station 154 without further value-added processing.

An approved pallet 166 (not shown) is conveyed forward until the basedeck positioning assembly 456 pauses the conveyor assembly 454. It will be noted that the basedeck positioning assembly 456 has a sensor 468 (not shown) which detects the pallet 166. The basedeck positioning assembly 456 furthermore has a locking pin 470 mounted to a basedeck lift 472 which is attached to a distal end of an extensible cylinder 474 so that when extended the locking pin 470 engages a bushing (not shown) in the bottom-side of the pallet 166. Once raised, the basedeck positioning assembly 456 furthermore has a deck clamp assembly 476 (see FIG. 21) attached to the conveyor assembly 454 which clamps the basedeck 102 for positive support and positioning thereof.

As is discussed below, the pack nest assembly 458 orients the shaft 234 of the spindle motor 106 to a desired location for mating alignment with contact pads located on a printed circuit board assembly which is attached thereto in a downstream station.

Figure 23:
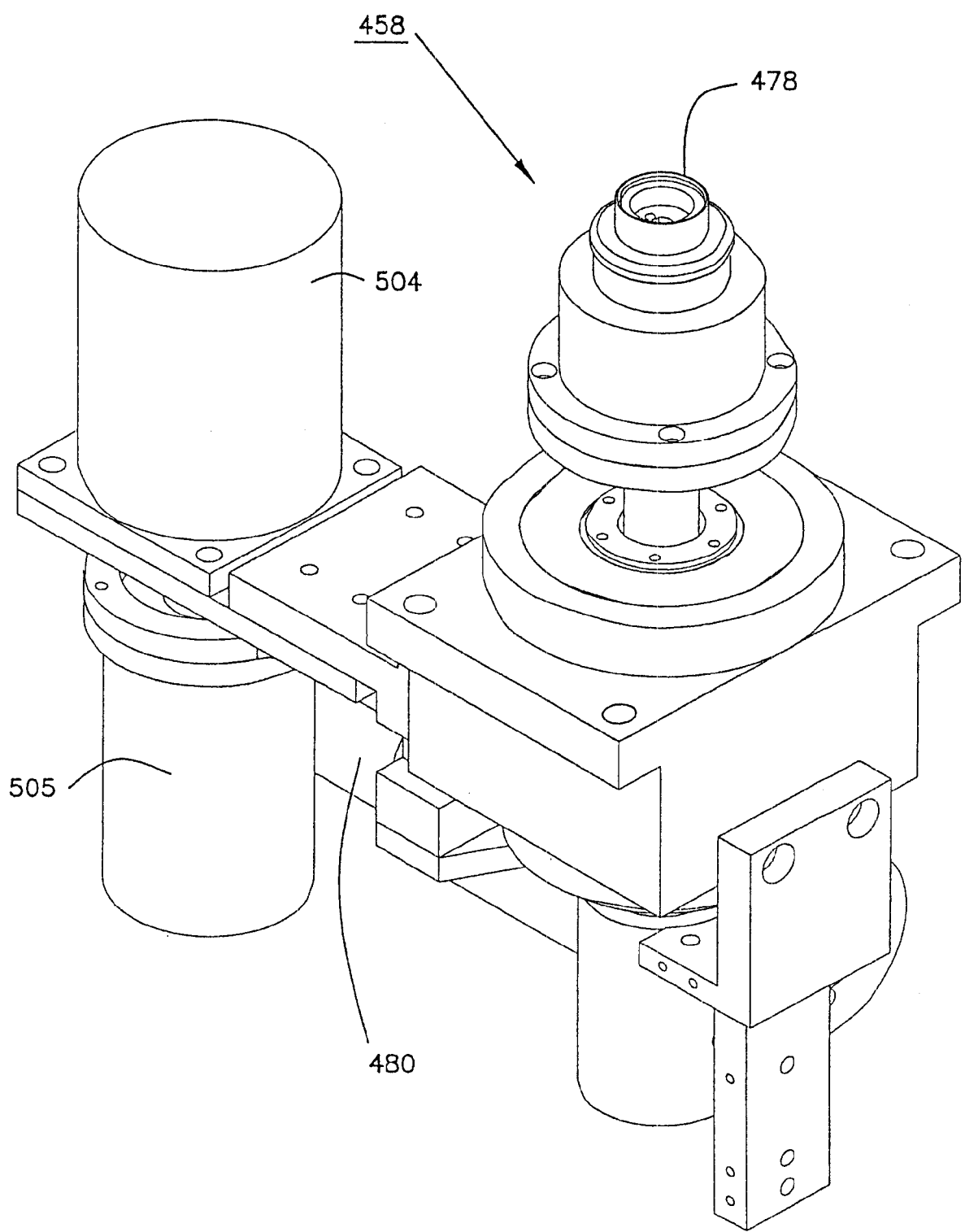
FIG. 23 is an isometric view of the pack nest assembly of the head-disc merge station of FIG. 21.
Figure 24:
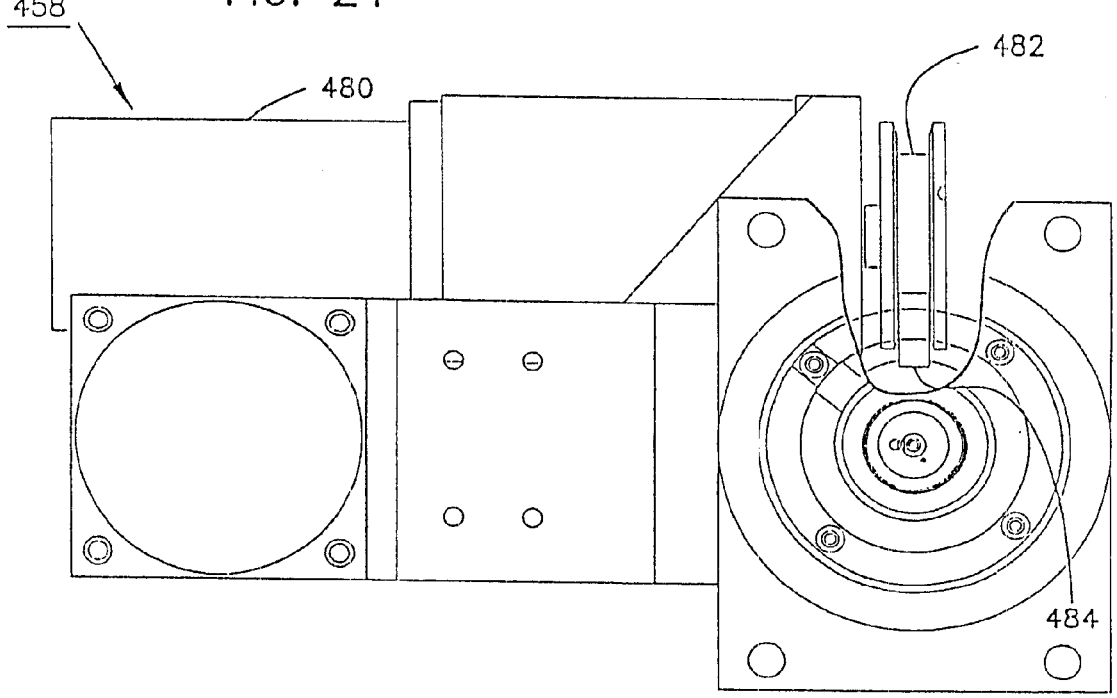
FIG. 24 is a partially cutaway, top plan view of the pack nest assembly of FIG. 23.
Figure 25:
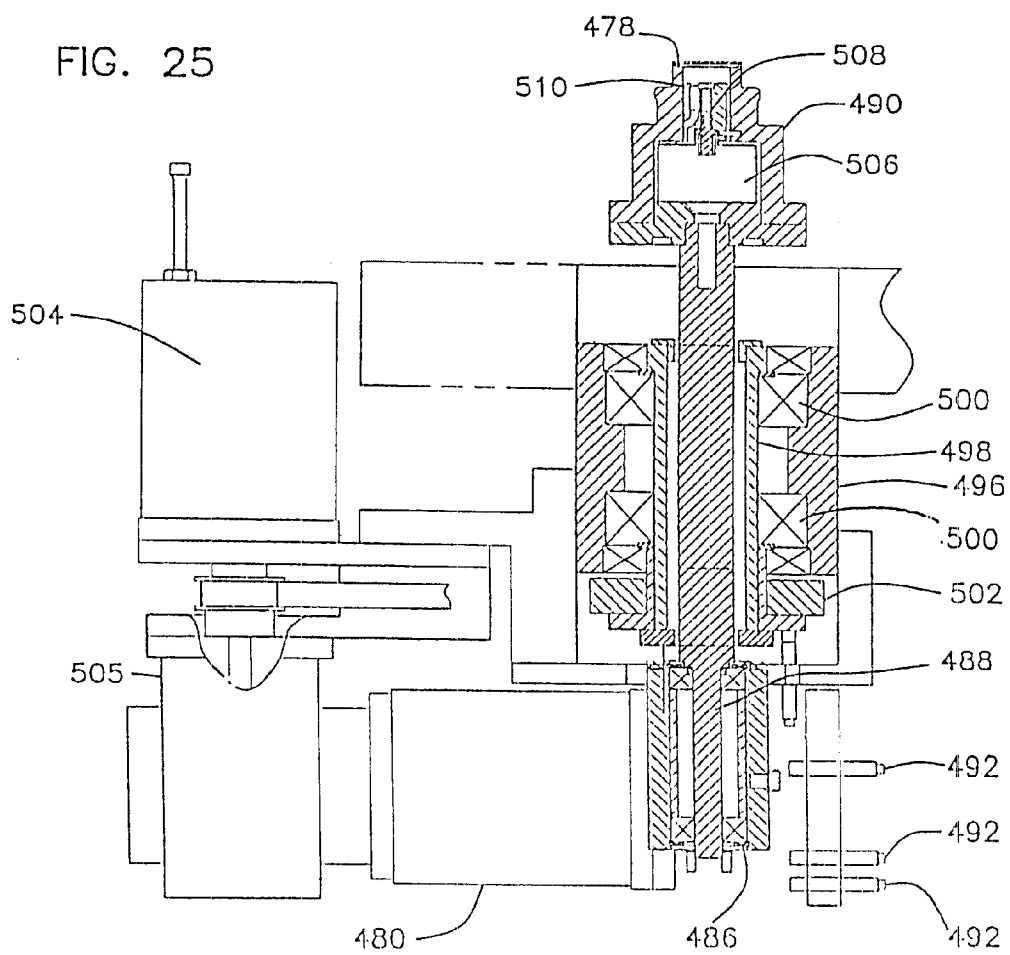
FIG. 25 is a partial sectional view of the pack nest assembly of FIG. 24.

From FIGS. 23 through 25 it will be noted that the pack nest assembly 458 has a spindle 478 which is matingly engageable with the spindle motor 106, as will be discussed fully below. The spindle 478 is vertically positionable by way of a motor 480 that is operably connected to a gear 482 (see FIG. 24) which engages a rack 484. Rotation of the motor 480 thus imparts rotation to the gear 482 which, in turn, linearly advances the rack 484 which is attached to an external portion of a housing 486 (see FIG. 25). The housing 486 is attached to a shaft 488 that supports a nest block 490 which, in turn, supports the spindle 478. The motor 480 is a stepper motor with a feedback control provided by a number of sensors 492 that detect the home position as well as forward and reverse limits of travel in a conventional manner.

The shaft 488 is supported by a stationary housing 496 which encloses a sleeve 498 that is journalled in a pair of bearings 500. In this manner the shaft 488 is slidingly disposed within the sleeve 498 for raising and lowering the spindle 478. It will be further noted that the sleeve 498 supports a pulley 502 that is operably connected to a motor 504 having an encoder 505 for rotational positioning of the shaft 488. Rotation of the shaft 488 in this manner likewise rotates the nest block 490 and the spindle 478.

The nest block 490 houses an extensible cylinder 506 which, when extended, supports a stud 508 in an extended position adjacent the spindle 478. The nest block 490 further supports a sensor 510.

In operation, the pack nest assembly 458 raises the spindle 478 upward to a position closely adjacent the bottom of the spindle motor 106, which is supported by the pallet 166. The motor 504 rotates the nest block 490, and thus the sensor 510, sufficiently to locate one of the three indicating apertures 240 on the spindle motor 106 (FIG. 6). With the indicating aperture 240 located at a relative position, the motor 504 indexes the nest block 490 to align the stud 508 with the indicating aperture 240 at the relative position. When the stud 508 is aligned with the indicating aperture 240, the cylinder 506 is activated to extend a distal end of the stud 508 into the indicating aperture 240 at the relative position. The motor 504 rotates the stud 508 to a selected reference position, that being the position which places the electrical contacts 238 in alignment with pads on the printed circuit board assembly which is installed in a downstream assembly station. With the spindle motor 106 so oriented for subsequent electrical connection, it will be noted that the operations described in the following are performed by moving the disc pack 174 to various locations in three-planar space, but that the spindle motor 106 is not rotated and the electrical contacts 238 remain fixed at the reference position.

After aligning the electrical contacts 238 to the reference position, the motor 480 raises the spindle 478 to lift the disc pack 174 upward from the pallet 166, thus presenting the disc pack 174 to the transfer assembly 460.

Figure 26:
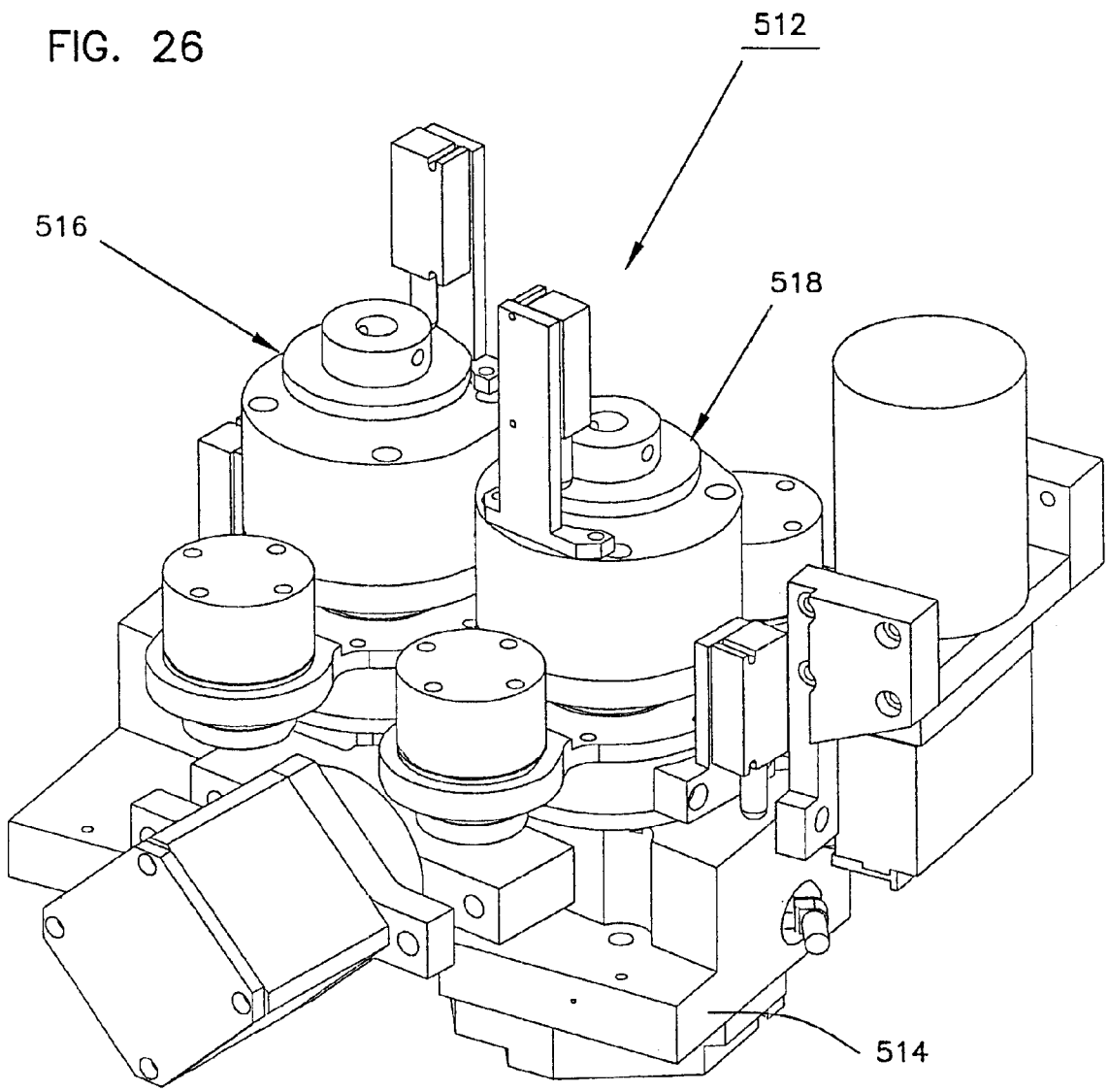
FIG. 26 is an isometric view of the end effector assembly of the head-disc merge station of FIG. 21.

Turning now to FIG. 26, shown therein is an end effector 512 which is supported by the transfer assembly 460, the end effector 512 having a base 514 that supports a first top collet assembly 516 and a second top collet assembly 518. Tile construction and operation of these collet assemblies 516, 518 is substantially the same as that of the top collet assembly 324 described above. As such, a detailed discussion of the construction of these collet assemblies 516, 518 would be duplicative and therefore not necessary for an understanding of the transfer assembly 460 of tie present invention.

Figure 27:
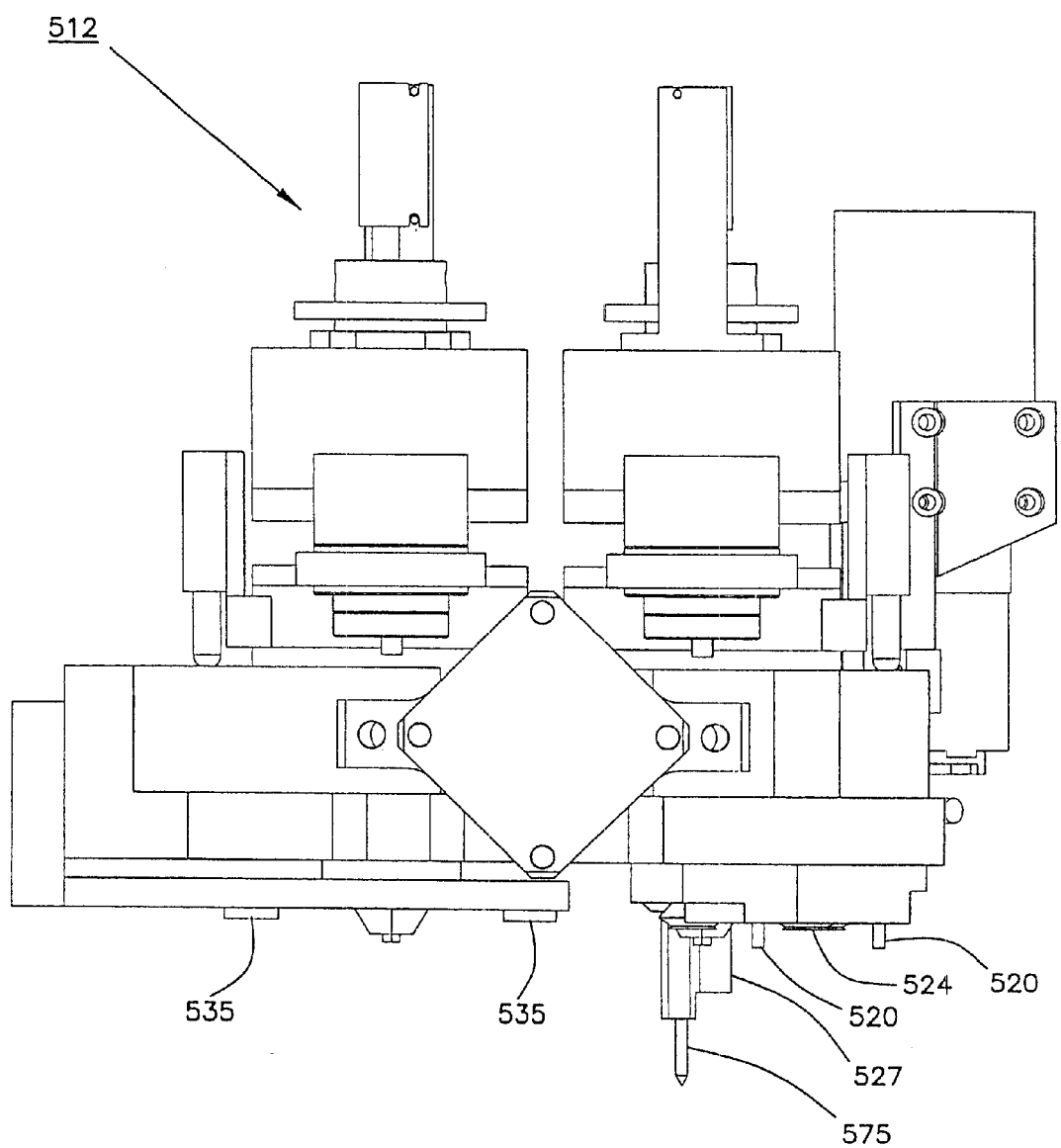
FIG. 27 is an elevational view of the end effector assembly of FIG. 26.

Further, FIG. 27 shows the end effector 512 has a pair of pins 520 and a vacuum assisted suction cup 524 which engage the magnet assembly 126 for picking from the pallet 166, as discussed in detail below.

FIG. 21 shows the base 514 is supported by a mount 526 which, in turn, is part of the transfer assembly 460 which also includes a three-axis servo table 525 which enables three dimensional positioning of the end effector 512. The three-axis servo table is of conventional construction, such as one manufactured by AccuFab Systems of Corvalis, Oreg., model 1250 controller and table.

In operation, the transfer assembly 460 positions the end effector 512 above the pallet 166 and simultaneously positions the disc pack 174 and the magnet assembly 126 for merging. The transfer assembly 460 positions the first top collet assembly 516 to supportingly engage the disc pack 174. The transfer assembly 460 moves the disc pack 174 to a merge slide assembly 528, which receivingly supports and temporarily shuttles the disc pack as described below. The transfer assembly 460 has locating pins 520 and a suction cup 524 that simultaneously supportingly engage the magnet assembly 126. The transfer assembly 460 thus moves the magnet assembly 126 to a magnet load assembly 532.

The transfer assembly 460 returns the end effector 512 to the pallet 166 where the second top collet assembly 518 supportingly engages the E-block 112. A sleeve 527 receivingly engages a stop pin 531 (see FIG. 1) of the E-block 112. The transfer assembly 460 moves the E-block 112 to an E-block nest assembly 530.

Figure 28:
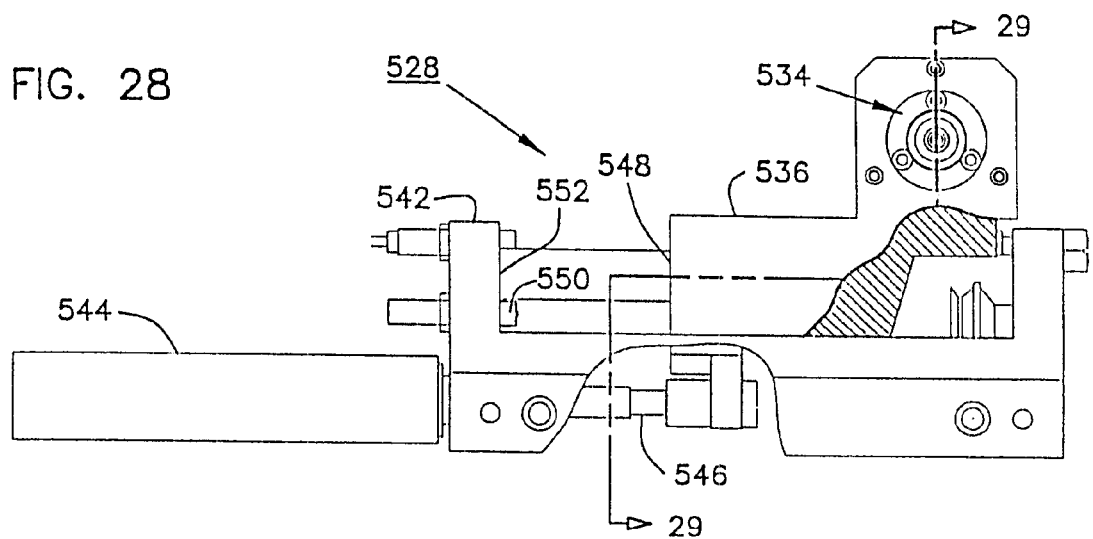
FIG. 28 is a partially cutaway, top view of a merge slide assembly of the head-disc merge station of FIG. 21.
Figure 29:
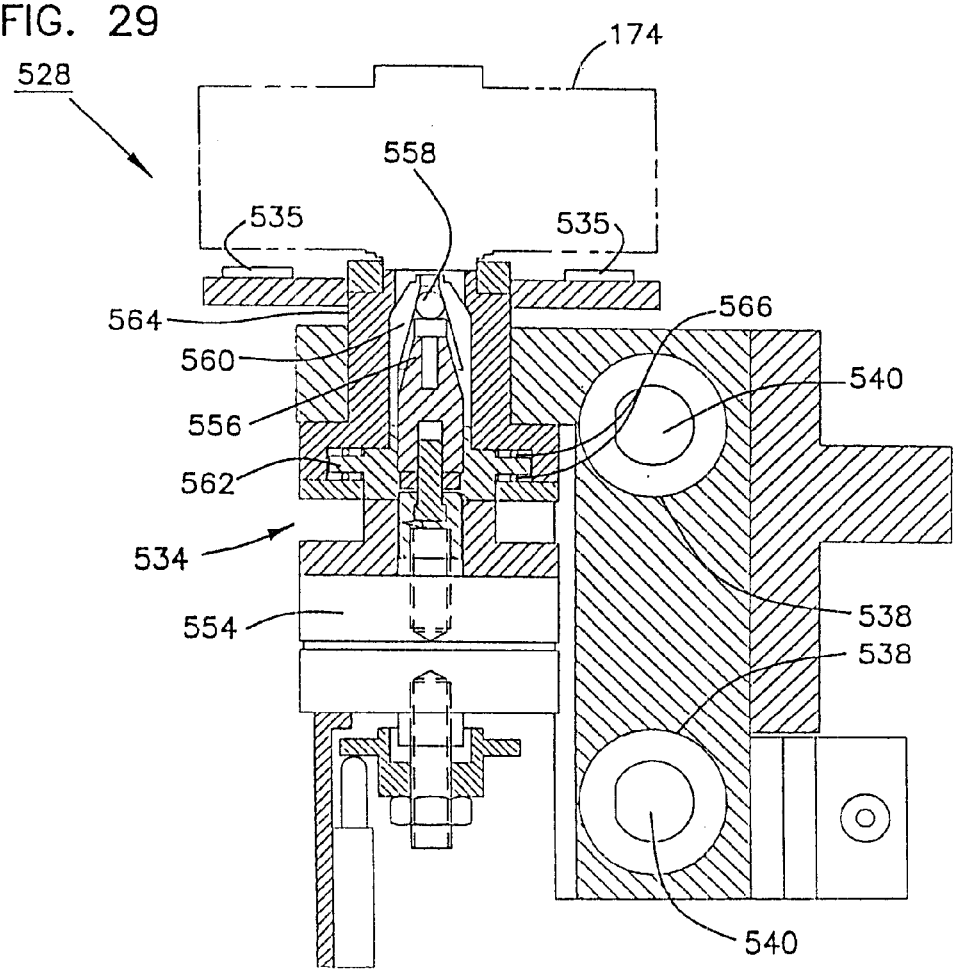
FIG. 29 is a partial sectional view of the merge slide assembly taken along the line 29—29 of FIG. 28.

FIG. 28 is a top view of the merge slide assembly 528, from which it will be noted that a collet assembly 536 receivingly supports the disc pack 174 (see FIG. 29). After the disc pack 174 is transferred by the end effector 512 to the collet assembly 534, a number of sensors 535 supported below the disc pack 174 by the merge slide assembly 528 (see FIG. 29) and supported above the disc pack 174 by the end effector 512 (see FIG. 27), locate the position of the bottom and top discs 108. The sensors 535 thus detect the overall height and squareness of the disc pack 174.

These measurements are used by the station control computer to adjust a head spreader assembly 537 (see FIG. 22) to optimize a spreading action of the load arms 118 of the E-block 112 during merging. The head spreader assembly 537 has a comb 539 which is vertically positioned by a cylinder 541 and linearly advanced into the E-block 112 by a cylinder 543 to wedgingly provide sufficient clearance between opposing heads 120 for the passage of the corresponding data disc 108 during merge operation. With the head spreader assembly 537 activated, a shipping comb (not shown) is removed from the E-block 112 by a third operator designated as 539, and the disc pack 174 is moved back to the unshuttled position, thereby merging the disc pack 174 and the E-block 112.

Returning to FIG. 28, the collet assembly 534 is supported by a sliding block 536 that has a pair of slider bushings 538 (see FIG. 29) slidingly supported on bearing shafts 540. The bearing shafts 540 are supported by a fixed block 542 which is attached to the base 514. The sliding block 536 is linearly positioned by a cylinder 544 which is fixedly attached at a first end to the fixed block 542 and which has an extensible rod 546 that is attached to the sliding block 536. In this manner the collet assembly 534 is moveable between a merge position, as shown in FIG. 28, and a shuttled position where a surface 548 of the sliding block 534 abuttingly engages a shock absorber 550 which extends from a surface 552 of the fixed block 542.

FIG. 29, a sectional view taken along line 29—29 of FIG. 28, shows the collet assembly 534 having a cylinder 554 which drives an actuator pin 556 against a tooling ball 558 which opens a collet 560. When the cylinder 554 is actuated, as shown in FIG. 29, the collet 560 clamps the inner bore of the threaded shoulder 236 of the spindle motor 106 in supporting engagement thereof Subsequent deactivation of the cylinder 554 causes the actuator pin 556 to release the tooling ball 558 from the collet 560 to release the clamping support of the disc pack 174.

Similar to collet assemblies previously described, the collet assembly 534 is compliantly supported so as to provide two degree freedom of movement of the collet 560 for self-centering about the shoulder 236 while clamping thereto. This is accomplished by supporting the cylinder 554 and all the components that depend therefrom on a cylinder adapter 562 having extending portions receivingly disposed in a nest block 564 that is rigidly attached to the nest block 564. A sliding relationship between the cylinder adapter 562 and the nest block 564 is provided by a plurality of ball bearings 566 interposed therebetween both above and below the cylinder adapter 562 extending portions.

Figure 30:
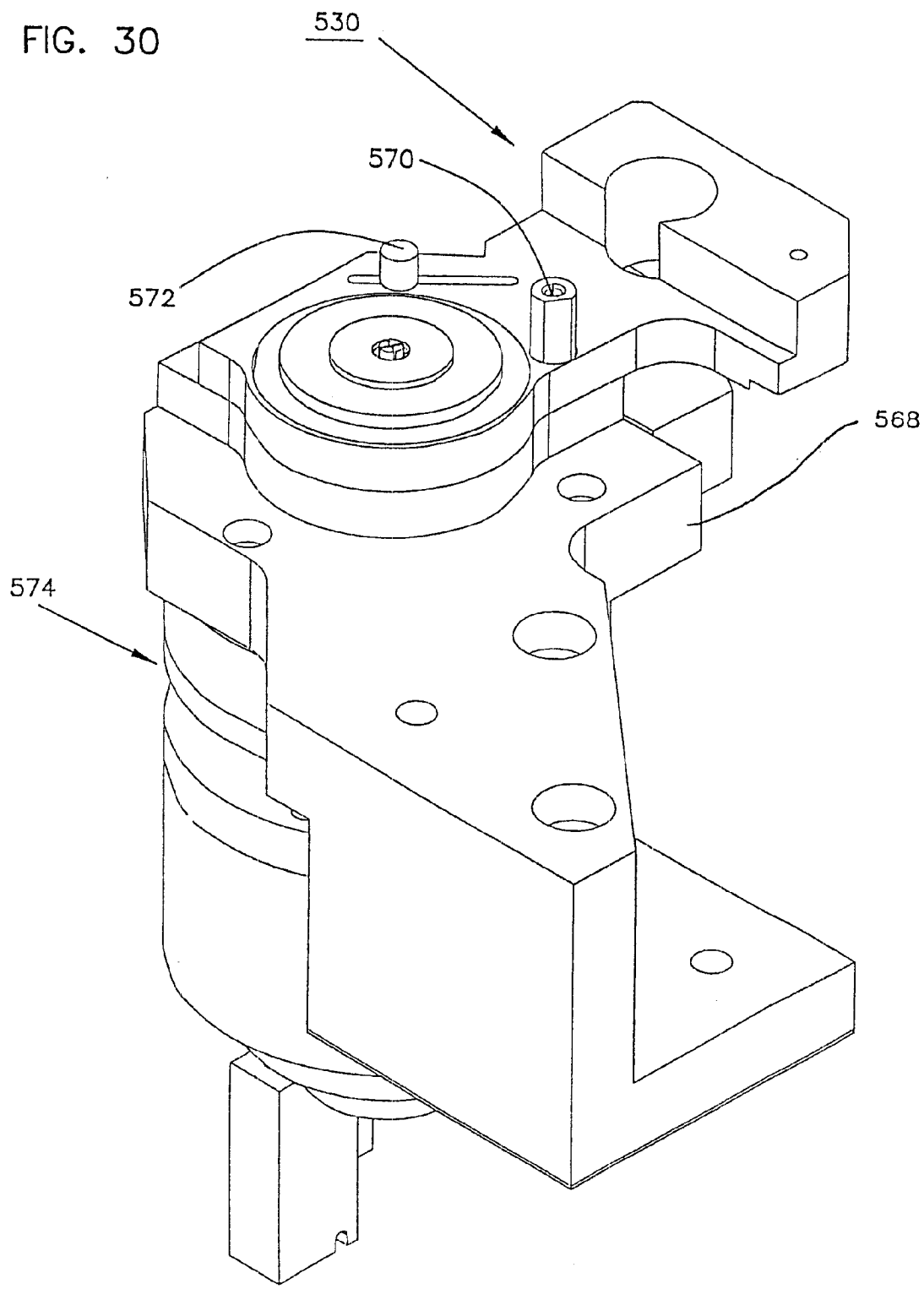
FIG. 30 is an isometric view of the E-block nest assembly of the head-disc merge station of FIG. 21.

FIG. 30 is an isometric view of the E-block nest assembly 530 which has a mount 568 supporting a bottom sleeve 570 which receives the stop pin 531 (see FIG. 1) of the E-block 112. A sensor 572 measures the amount of tilt in the placement of the E-block on a collet assembly 574, stopping the merge process if the amount of tilt is beyond a specified amount. A latch pin 575 (see FIG. 27) has a tapered leading edge that slidingly engages a surface 577 (see FIG. 1) of the latch 127, thereby rotating the latch 127 for passage of the stop pin 531 of the E-block 112 into a locking arm 579 (see FIG. 1) of the latch 127. With the stop pin 531 thus positioned inside the locking arm 579, the cartridge bearing 114 of the E-block 112 is supported by the collet assembly 574 during the merge procedure.

Figure 31:
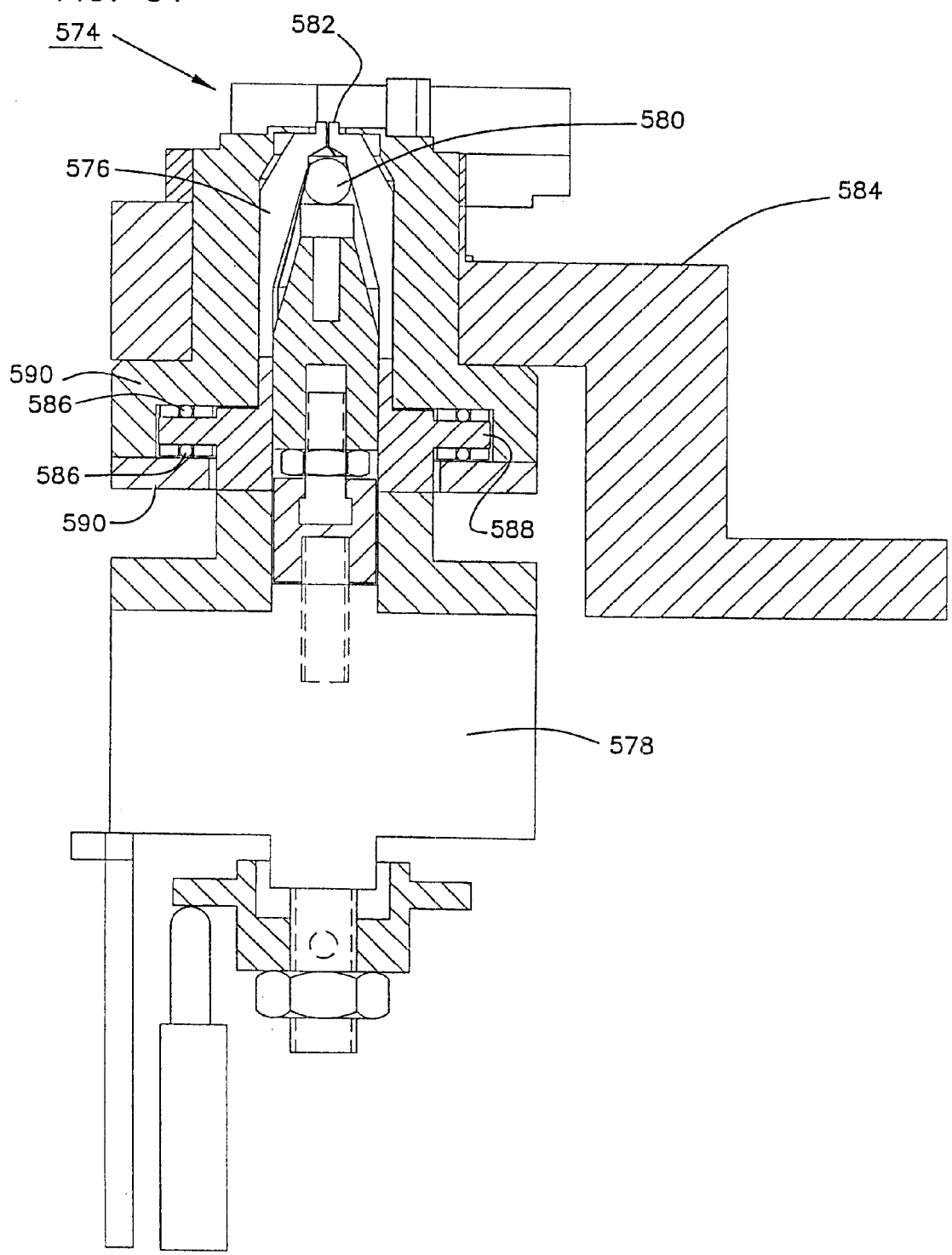
FIG. 31 is a partial sectional view of the collet assembly of the E-block nest assembly of FIG. 30.

FIG. 31 shows a partial sectional view of the E-block nest assembly 530 wherein it will be noted that the collet assembly 574 is of similar construction as the top collet assembly 324 of FIG. 13, in that the collet assembly 574 has an inner diameter gripping collet 576 that grips the cartridge bearing of the E-block 112 in the same manner that the top collet assembly 324 grips the central aperture 248 of the spindle motor 106. In the same manner as explained hereinabove, the collet assembly 574 has a cylinder 578 that when activated engages a tooling ball 580 against the collet 576 to spread a tip 582 into pressing engagement with the E-block 112. The collet assembly 574 is also compliantly supported with respect to a mounting framework 584 by a plurality of ball bearings 586 disposed between a collet supporting flange member 588 and a nest block 590 that is rigidly supported by the framework 584. Further detailed discussion of the construction of the collet assembly 574 is unnecessary in light of the previous discussion of collet assemblies hereinabove together with the similarities thereto.

Figure 32:
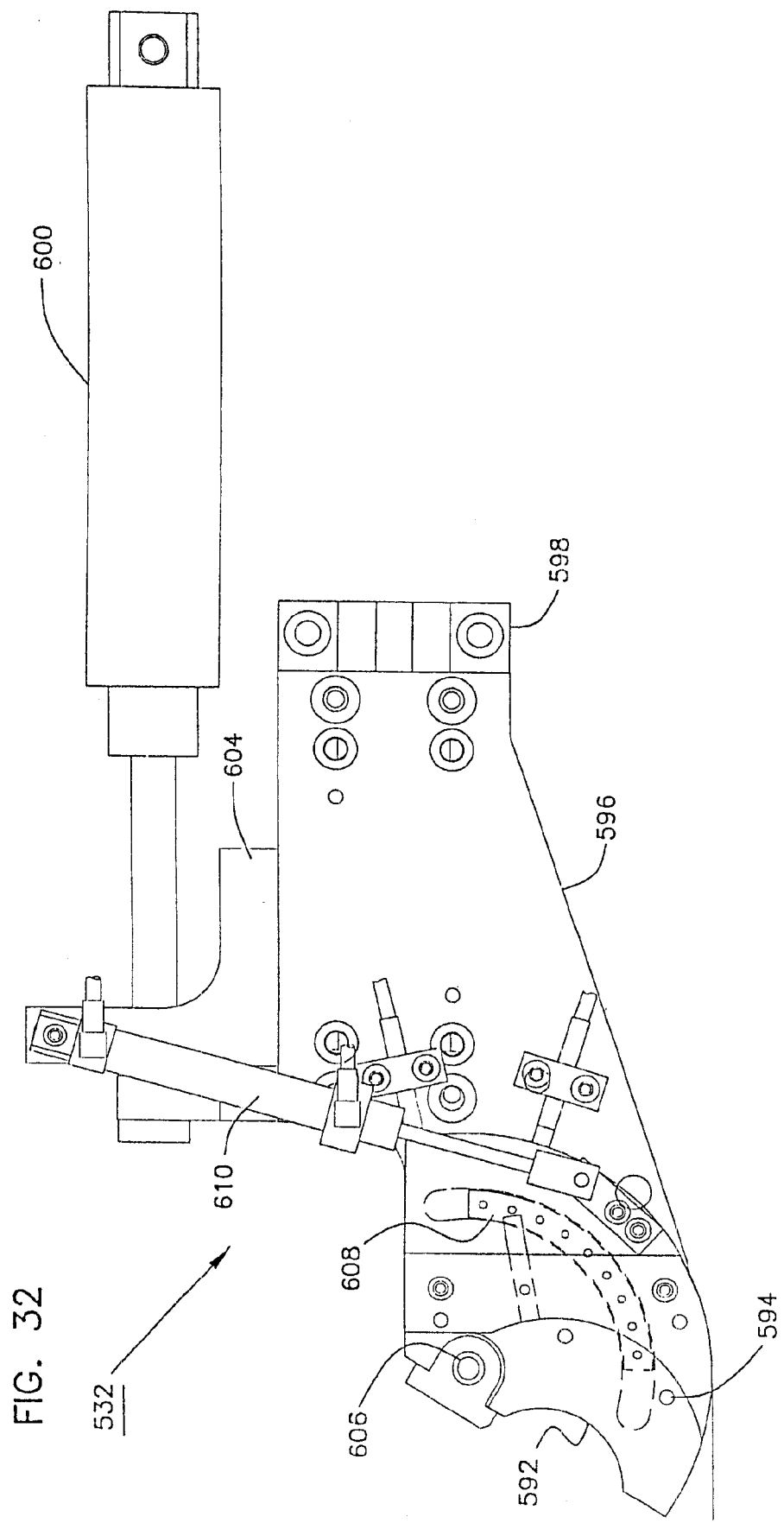
FIG. 32 is a top view of the magnet load assembly of the head-disc merge station of FIG. 21.

Thus it will be understood that the E-block nest assembly 530 positions and supports the E-block 112 for merging. The E-block 112 and the magnet assembly 126 are merged by the magnet load assembly 532, shown in FIG. 32. The magnet load assembly 532 has a nest plate 592 with a locating pin 594 which receivingly positions the magnet assembly 126 from the end effector 512. The nest plate 592 is supported by a nest block 596 which slidingly engages a slide 598. A first cylinder 600 is attached at a first end to the base 514 by a supporting bracket 602 (FIG. 22) to which the cylinder 600 is pinned. An extensible rod of the first cylinder 600 is attached to the nest block 596 by a supporting bracket 604 so that extension of the first cylinder 600 imparts linear movement of the nest block 596 and nest plate 592 along the slide 598.

The nest plate 592 is pivotally attached to the nest block 596 by a bearing 606 and is supported for rotation about the bearing 606 by a slider bearing assembly 608. A second cylinder 610 leas a first end pinned to the bracket 604 and an extensible rod attached to the nest plate 592 to impart rotation thereof about the bearing 606. In the second cylinder 610, in the extended position shown in FIG. 32, the magnet assembly 126 is in the final assembled position. In a retracted position of the second cylinder 610, the magnet assembly 126 is rotated to provide clearance with the E-block 112 during merging. In operation, therefore, both cylinders 600, 610 begin in a retracted position. The first cylinder 600 first advances the magnet into a juxtaposed position with the E-block 112, and the second cylinder 610 rotates the magnet assembly 126 into final position.

With the merging of the disc pack 174, the E-block 112, and the magnet assembly 126 complete, the entire merged assembly is transferred by the end effector 512 to the basedeck 102. The end effector 512 supportingly and simultaneously grasps each of the three assemblies. The disc pack 174 is gripped by the first top collet assembly 516, and thereafter the collet assembly 534 releases the disc pack 174. The E-block 112 is gripped by the second top collet assembly 518, and thereafter the collet assembly 574 releases the disc pack 174. The magnet assembly 126 is supported by the suction cup 524.

A spanner nut and a number of machine screws are placed in the bits of electric drivers 626 (FIG. 21) to secure the spindle motor 106, the cartridge bearing 114 of the E-block assembly 112 and the magnet assembly 126 to the basedeck 102. The transfer assembly 460 moves the merged components, while maintaining the merged interrelationship into the basedeck 102. The electric drivers 626 secure the fastening hardware through the basedeck 102 and into the component assemblies. The assembly cycle of merging the disc pack 174, E-block 112 and the magnet assembly 126 thus completed, the pallet 166 is ready for release to the filter install station 156.

Filter Install Station

From the merge station 154 the pallet 166 containing the merged disc pack 174, E-block 112 and the magnet assembly 126 is conveyed by the conveyor 164 to the filter install station 156 where a sensor locates the pallet 166 and a pair of extensible pins engage the bushings on the bottom of the pallet 166. A cylinder extends to supportingly lift the basedeck 102 upward off the pallet 166 for work thereon. A fourth operator, designated as 628, manually installs a recirculation filter (not shown) and a desiccant filter (not shown) in the basedeck 102. The fourth operator 628 also secures the flex circuit bracket 136 to the basedeck 102 and releases the pallet 166 to be conveyed to the cover install station 158 in the disc drive assembly line 138.

Cover Install Station

From the filter install station 156 the pallet 166 is conveyed by the conveyor 164 to the cover install station 158 where a sensor locates the pallet 166 and a pair of extensible pins engage the bushings on the bottom of the pallet 166. A cylinder extends to supportingly lift the basedeck 102 upward off the pallet 166 for work thereon. A fifth operator, designated as 630, places a gasket 632 (see FIG. 1) and the top cover 104 onto the basedeck 102 and attaches fasteners through the top cover 104 into the top of spindle motor 106, the cartridge bearing 114 and the magnet assembly 126, and further, the fifth operator 630 installs a number of fasteners to attach the top cover 104 to the basedeck 102.

Line Off-Load Station

From the cover install station 158 the pallet 166 is conveyed by the conveyor 164 to the off-load station 160 where a sixth operator, designated as 634, determines from the production system computer whether the assembled disc drive 100 is a completed and acceptable unit. The acceptable units are removed from the continuous conveyor 164 and placed in a shipping queue. The unacceptable units are sent to the transfer conveyor 168, for routing to the beginning station for repair or rework.

It is clear that the present invention is well adapted to attain the ends and advantages mentioned as well as those inherent therein. While a presently preferred embodiment of the invention has been described for purposes of the disclosure, it will be understood that numerous changes can be made which will readily suggest themselves to those skilled in the art and which are encompassed within the spirit of the invention disclosed and as defined in the appended claims.

What is claimed is:

1. A method of assembling a disc drive from a plurality of components comprising a disc pack, an E-block, a magnet, and a basedeck, wherein the disc pack comprises a disc journaled about a disc drive motor, the method comprising steps of:

(a) placing the disc pack in a merge slide assembly;

(b) shuttling the merge slide assembly to move the disc pack to a shuttled position;

(c) placing the E-block in an E-block nest assembly loading the opposing read/write heads on each disc of the disc pack;

(d) placing the magnet in a magnet load assembly;

(e) spreading the E-block to provide clearance between adjacent read/write heads thereof;

(f) shuttling the merge slide assembly to move the disc pack to the merged position to dispose each disc of the disc pack between opposing read/write heads of the E-block;

(g) disengaging the E-block to release the read/write heads;

(h) shuttling the magnet load assembly to merge to the merged position the magnet and the E-Block;

(i) transporting the disc pack, E-block and magnet together to the basedeck;

(j) fastening the disc pack, E-block and magnet together to the basedeck.

2. The method of claim 1, wherein the shuttling steps (b), (f), and (h) each further comprise a step of using a collet that is movable between the merge position and the shuttle position.

3. The method of claim 1, wherein the placing step (c) further comprises a step of transporting the E-block with a three-axis servo table to the E-block nest assembly.

4. The method of claim 1, wherein the spreading step (e) further comprises a step of spreading the E-block with a head spreader assembly based on measurements made by sensors which measure the height and squareness of the disc pack.

5. The method of claim 1, wherein the moving step (i) further comprises a step of merging together the disc pack, the E-block, and the magnet assembly with the merge slide assembly and the magnet load assembly.

6. The method of claim 1, wherein the shuttling step (h) is interrupted when an angular tilt of the magnet load assembly with respect to the E-block is beyond a predetermined limit.

7. The method of claim 1, further comprising a step of (k) providing a station control computer, and wherein steps (a) through (j) are carried out under control of the station control computer.

8. The method of claim 1, in which shuttling step (h) comprising steps of:

(h1) advancing the magnet into a juxtaposed position adjacent the E-block with a first actuator; and (h2) rotating the magnet into a final position in operative alignment adjacent the E-block with a second actuator.

9. The method of claim 1, in which transporting step (i) comprising steps of:

(i1) merging together the disc pack, the E-block, and the magnet using the merge slide assembly and the magnet load assembly;

(i2) positioning an end effector adjacent the disc pack, E-block and the magnet;

(i3) grasping simultaneously the disc pack, E-block and magnet with the end effector;

(i4) transporting the disc pack, E-block and magnet together to the basedeck; and (i5) placing the disc pack, E-block and magnet together into the basedeck.

* * * * *